United States Patent
Uchida et al.

(10) Patent No.: US 12,359,424 B2
(45) Date of Patent: Jul. 15, 2025

(54) SOUND INSULATING STRUCTURE

(71) Applicant: Mitsubishi Chemical Corporation, Tokyo (JP)

(72) Inventors: Naoyuki Uchida, Tokyo (JP); Kazuma Inoue, Tokyo (JP); Masanari Nakayama, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 266 days.

(21) Appl. No.: 17/849,884

(22) Filed: Jun. 27, 2022

(65) Prior Publication Data
US 2022/0333372 A1    Oct. 20, 2022

Related U.S. Application Data

(63) Continuation of application No. PCT/JP2020/049129, filed on Dec. 28, 2020.

(30) Foreign Application Priority Data

Dec. 27, 2019 (JP) ................. 2019-239424

(51) Int. Cl.
*E04B 1/82* (2006.01)
*B60R 13/08* (2006.01)

(52) U.S. Cl.
CPC ............ *E04B 1/82* (2013.01); *B60R 13/0815* (2013.01)

(58) Field of Classification Search
CPC ..... B60R 13/0815; E04B 1/82; E04B 1/8409; E04B 1/86; E04B 2001/8419; E04B 2001/8428; B32B 2307/102; B32B 3/30
See application file for complete search history.

(56) References Cited

U.S. PATENT DOCUMENTS

| | | | |
|---|---|---|---|
| 4,223,073 A | | 9/1980 | Caldwell et al. |
| 4,515,239 A | * | 5/1985 | Blatt .................. B32B 5/18 |
| | | | 181/290 |

(Continued)

FOREIGN PATENT DOCUMENTS

| | | |
|---|---|---|
| CN | 108137998 A | 6/2018 |
| CN | 110337688 A | 10/2019 |

(Continued)

OTHER PUBLICATIONS

Garcia-Barruetabena et al. "Dynamic Characterization of Adhesive Materials for Vibration Control," Adhesives-Applications and Properties, InTech, 289-339 (2016).

(Continued)

*Primary Examiner* — Jeremy A Luks
(74) *Attorney, Agent, or Firm* — Morgan, Lewis & Bockius LLP

(57) ABSTRACT

The present invention addresses the problem of providing a sound insulating structure which provides a sufficient sound insulating effect even when an adhesive layer is arranged therein, and in which a shift in the frequency band where the sound insulating effect is generated is unlikely to occur. This sound insulating structure includes, at least: a sound insulating member that includes a sheet-like sheet section and plural projections arranged on the sheet section; and an adhesive layer arranged on a surface of the sheet section on the opposite side of the side provided with the projections, and the sound insulating structure satisfies the following Formula (1): $E\_glue/I\_glue > 0.5 \times (E\_membrane/H)$ (1) (wherein, E_glue (MPa): storage modulus of adhesive layer, I_glue (mm): average thickness of adhesive layer, E_membrane (MPa): storage modulus of sheet section and projections, and H (mm): average height of sheet section and projections).

18 Claims, 22 Drawing Sheets

(56) References Cited

U.S. PATENT DOCUMENTS

| | | | | |
|---|---|---|---|---|
| 5,854,453 | A | * | 12/1998 | Fujiwara .................. E04B 1/86 |
| | | | | 181/295 |
| 8,770,343 | B2 | * | 7/2014 | Mathur .................... B32B 3/12 |
| | | | | 428/116 |
| 11,168,474 | B2 | * | 11/2021 | Koga ...................... B32B 25/20 |
| 2007/0020447 | A1 | * | 1/2007 | Yamaguchi ......... G10K 11/168 |
| | | | | 428/304.4 |
| 2009/0301810 | A1 | * | 12/2009 | Gandhi .................... E04B 1/86 |
| | | | | 181/290 |
| 2018/0340328 | A1 | | 11/2018 | Koga et al. |
| 2019/0362700 | A1 | | 11/2019 | Yamazoe et al. |
| 2021/0039361 | A1 | | 2/2021 | Koshitouge et al. |

FOREIGN PATENT DOCUMENTS

| | | |
|---|---|---|
| EP | 3231839 A1 | 10/2017 |
| EP | 3363872 A1 | 8/2018 |
| EP | 3413301 A1 | 12/2018 |
| JP | H03-175022 A | 7/1991 |
| JP | H06-508938 A | 10/1994 |
| JP | 2000-265593 A | 9/2000 |
| JP | 2001-303691 A | 10/2001 |
| JP | 2010-097137 A | 4/2010 |
| JP | 2019-031899 A | 2/2019 |
| JP | 2019-190046 A | 10/2019 |
| WO | 93/00675 A1 | 1/1993 |
| WO | 2011/046120 A1 | 4/2011 |
| WO | 2017/135409 A1 | 8/2017 |
| WO | 2019/208727 A1 | 10/2019 |

OTHER PUBLICATIONS

Extended European Search Report issued in corresponding European Patent Application No. 20907012.7 dated Jan. 4, 2023.
Assouar et al., "Broadband plate-type acoustic metamaterial for low-frequency sound attenuation," Applied Physics Letters, 101: 173505 (2012).
Oudich et al., "Negative effective mass density of acoustic metamaterial plate decorated with low frequency resonant pillars," Journal of Applied Physics, 116: 184504 (2014).
Oudich et al., "A sonic band gap based on the locally resonant photonic plates with stubs," New Journal of Physics, 12: 083049 (2010).
International Search Report issued in related International Patent Application No. PCT/JP2020/049129 dated Mar. 23, 2021.
International Preliminary Report on Patentability and Written Opinion issued in related International Patent Application No. PCT/JP2020/049129 dated Jul. 7, 2022.
Extended European Search Report issued in corresponding European Patent Application No. 25151115.0, dated Feb. 25, 2025.
Office Action issued in corresponding Chinese Patent Application No. 202080090819.5 dated Apr. 30, 2025.

* cited by examiner

SOUND INSULATING STRUCTURE

CROSS-REFERENCE TO RELATED APPLICATION

This is a continuation of International Application PCT/JP2020/049129, filed on Dec. 28, 2020, and designated the U.S., and claims priority from Japanese Patent Application 2019-239424 which was filed on Dec. 27, 2019, the entire contents of which are incorporated herein by reference.

TECHNICAL FIELD

The present invention relates to a sound insulating structure.

BACKGROUND ART

Buildings such as housing complexes, office buildings, and hotels are required to offer quietness suitable for the use of their rooms by blocking the outside noise coming from automobiles, trains, airplanes, ships and the like, as well as equipment noise and human voices generated inside the buildings. Further, in vehicles such as automobiles, trains, airplanes, and ships, it is necessary to reduce the interior noise by blocking wind noise and engine noise so that passengers are provided with a quiet and comfortable space. Therefore, means for blocking the propagation of noise and vibration from outside to the inside of a room or from outside to the cabin of a vehicle, i.e. vibration-damping and sound insulating means, have been studied and developed. In recent years, buildings are required to have lightweight vibration-damping and sound insulating members in association with verticalization and the like, and lightweight vibration-damping and sound insulating members are also demanded in vehicles for improvement of energy efficiency. Moreover, for improvement in the design freedom of buildings, vehicles, and their equipment, there is a demand for a lightweight vibration-damping and sound insulating member that is applicable to complex shapes as well.

Generally, properties of a vibration-damping and sound insulating member follow so-called law of mass. In other words, the transmission loss, which is an index of the amount of noise reduction, is determined by a logarithm of the product of the mass of the vibration-damping and sound insulating member and the frequency of an elastic wave or a sound wave. Accordingly, in order to increase the amount of noise reduction at a certain frequency, the mass of the vibration-damping and sound insulating member needs to be increased. However, a method of increasing the mass of the vibration-damping and sound insulating member puts a limitation on the amount of noise reduction due to constraints on the mass of buildings, vehicles and the like.

In order to solve the problem with an increase in the mass of a vibration-damping and sound insulating member, improvements have been made in the member structure. For example, a method of using plural rigid plate materials, such as gypsum boards, concrete plates, steel sheets, glass plates or resin plates, in combination, and a method of constructing a hollow double-wall structure or a hollow triple-wall structure using gypsum boards or the like are known.

Further, in recent years, sound insulating boards made of a plate-type acoustic metamaterial in which a high-rigidity plate material and resonators are used in combination have been proposed for realization of sound insulating performance that exceeds the law of mass. Specifically, there have been proposed sound insulating plates in which plural independent stub-like projections (resonators) made of silicone rubber and tungsten, or plural independent stub-like projections (resonators) made of rubber are arranged on an aluminum substrate (see Non-patent Documents 1 and 2), and a sound insulating plate in which plural independent stub-like projections (resonators) made of silicone rubber, or silicone rubber and a lead cap, are arranged on an epoxy substrate (see Non-patent Document 3).

In addition, a sound insulation sheet member that includes an viscoelastic sheet and resonant parts each having a base portion and a weight portion has been proposed (Patent Document 1).

Moreover, a structure in which vibration-damping sound-insulating materials are adhered and laminated via an elastic adhesive has been disclosed (Patent Document 2).

RELATED ART DOCUMENTS

Patent Documents

[Patent Document 1] WO 2017/135409
[Patent Document 2] Japanese Unexamined Patent Application Publication No. 2001-303691

Non-Patent Documents

[Non-patent Document 1] M. B. Assouar, M. Senesi, M. Oudich, M. Ruzzene and Z. Hou, Broadband plate-type acoustic metamaterial for low-frequency sound attenuation, Applied Physics Letters, 2012, volume 101, pp 173505.
[Non-patent Document 2] M. Oudich, B. Djafari-Rouhani, Y. Pennec, M. B. Assouar, and B. Bonello, Negative effective mass density of acoustic metamaterial plate decorated with low frequency resonant pillars, Journal of Applied Physics, 2014, volume 116, pp 184504.
[Non-patent Document 3] M. Oudich, Y. Li, M. B. Assouar, and Z. Hou, A sonic band gap based on the locally resonant phononic plates with stubs, New Journal of Physics, 2010, volume 12, pp 083049.

SUMMARY OF THE INVENTION

Problems to be Solved by the Invention

The sound insulation sheet disclosed in Patent Document 1 not only exhibits high sound insulating performance exceeding the law of mass but also has excellent productivity and durability, despite being relatively lightweight; however, the details of adhesion method, material and conditions thereof are not sufficiently examined, except for the description that various methods are applicable.

That is, an arrangement method is not particularly limited and, for example, a method of press-bonding separately molded components by hot-pressing or pressing, a method of adhering components using a variety of known adhesives, and a method of joining components by heat welding, ultrasonic welding, laser welding or the like are mentioned as examples. With regard to an adhesive, for example, epoxy resin-based adhesives, acrylic resin-based adhesives, polyurethane resin-based adhesives, silicone resin-based adhesives, polyolefin resin-based adhesives, polyvinyl butyral resin-based adhesives, and mixtures thereof are mentioned; however, these are not particularly examined in detail.

Nevertheless, according to the studies conducted by the present applicants, it was found that, depending on the mode (thickness and properties) of an adhesive layer formed from an adhesive, the sound insulating effect may not be sufficient, and a shift occurs in the frequency band where the sound insulating effect is generated.

The present invention was made in view of the above-described background art. An object of the present invention (problem to be solved) is to provide a sound insulating structure which provides a sufficient sound insulating effect even when an adhesive layer is arranged therein, and in which a shift in the frequency band where the sound insulating effect is generated is unlikely to occur.

It is noted here that the object of the present invention is not limited to the above-described one, and another object of the present invention can be to provide actions and effects that are not obtained by the prior art but are derived from each constitution described below in the section of Mode for Carrying Out the Invention.

Means for Solving the Problems

The present inventors discovered that the above-described problems can be solved by using a sound insulating structure that includes a sheet section in the form of a sheet and plural projections arranged on the sheet section, in which the sheet is arranged via an adhesive layer having specific mechanical property values and shape, thereby completing the present invention.

That is, the present invention provides the following various concrete modes.

[1] A sound insulating structure, including, at least:
a sound insulating member that includes a sheet-like sheet section and plural projections arranged on the sheet section; and
an adhesive layer arranged on a surface of the sheet section on the opposite side of the side provided with the projections,
wherein the sound insulating structure satisfies the following Formula (1):

$$E\_glue/I\_glue > 0.5 \times (E\_membrane/H) \tag{1}$$

E_glue (MPa): storage modulus of adhesive layer
I_glue (mm): average thickness of adhesive layer
E_membrane (MPa): storage modulus of sheet section and projections
H (mm): average height of sheet section and projections.

[2] A sound insulating structure, including:
a sound insulating member that includes a sheet-like sheet section and plural projections arranged on the sheet section; and
an adhesive layer arranged on a surface of the sheet section on the opposite side of the side provided with the projections,
wherein the amount of normalized natural frequency shift satisfying the following formula is 0 to 30%:

Amount of normalized natural frequency shift (%)= ((Design natural frequency)−(Natural frequency))÷(Design natural frequency)

Design natural frequency (Hz): natural frequency determined in a condition without adhesive layer
Natural frequency (Hz): natural frequency determined in a condition with adhesive layer.

[3] A sound insulating structure, including:
a sound insulating member that includes a sheet-like sheet section and plural projections arranged on the sheet section; and
an adhesive layer arranged on a surface of the sheet section on the opposite side of the side provided with the projections, wherein the adhesive layer has an elastic modulus of more than 10 MPa.

[4] The sound insulating structure according to any one of [1] to [3], including an adherend to which the sound insulating member is adhered via the adhesive layer.

[5] The sound insulating structure according to [4], satisfying the following Formulae (2) and (3):

$$7{,}000 \geq E\_glue/E\_membrane \geq 0.5 \tag{2}$$

$$50.0 \geq E\_glue/E\_adh \geq 0.00002 \tag{3}$$

E_glue (MPa): storage modulus of adhesive layer
E_membrane (MPa): storage modulus of sheet
E_adh (MPa): storage modulus of adherend.

[6] The sound insulating structure according to any one of [1] to [5], satisfying the following Formula (4):

$$1.0 \geq I\_glue \geq 0.005 \tag{4}$$

I_glue (mm): average thickness of adhesive layer.

[7] The sound insulating structure according to any one of [1] to [6], wherein Formula (1) satisfies the following Formula (1)':

$$E\_glue/I\_glue > \beta \times (E\_membrane/H) \tag{1'}$$

wherein, E_glue, I_glue, E_membrane, and H have the same meanings as in Formula (1), and β=5.

[8] The sound insulating structure according to any one of [1] to [7], wherein the E_glue is more than 10 MPa.

[9] The sound insulating structure according to any one of [1] to [8], wherein
the adhesive layer contains one or more resins selected from the group consisting of silicone resins, epoxy resins, and cyanoacrylate resins, and
a total content ratio of these resins in the adhesive layer is 10% by weight or more.

[10] The sound insulating structure according to any one of [1] to [9], wherein
the adhesive layer contains an inorganic filler, and
a content ratio of the inorganic filler in the adhesive layer is 1% by weight or more.

[11] A method of producing a sound insulating structure including: a sound insulating member that includes a sheet-like sheet section and plural projections arranged on the sheet section; and an adhesive layer arranged on a surface of the sheet section on the opposite side of the side provided with the projections,
wherein
the method includes:
the step of forming a sound insulating member having plural projections on one side of a sheet section; and
the step of arranging an adhesive layer on the sound insulating member, and
the following Formula (1) is satisfied:

$$E\_glue/I\_glue > 0.5 \times (E\_membrane/H) \tag{1}$$

E_glue (MPa): storage modulus of adhesive layer
I_glue (mm): average thickness of adhesive layer
E_membrane (MPa): storage modulus of sheet section and projections
H (mm): average height of sheet section and projections.

[12] The method of producing a sound insulating structure according to [11], further including the step of arranging an adherend to which the sound insulating member is adhered via the adhesive layer.

Effects of the Invention

According to the present invention, a sound insulating structure which provides a sufficient sound insulating effect even when an adhesive layer is arranged therein, and in which a shift in the frequency band where the sound insulating effect is generated is unlikely to occur, can be provided.

MODE FOR CARRYING OUT THE INVENTION

Figure 1:
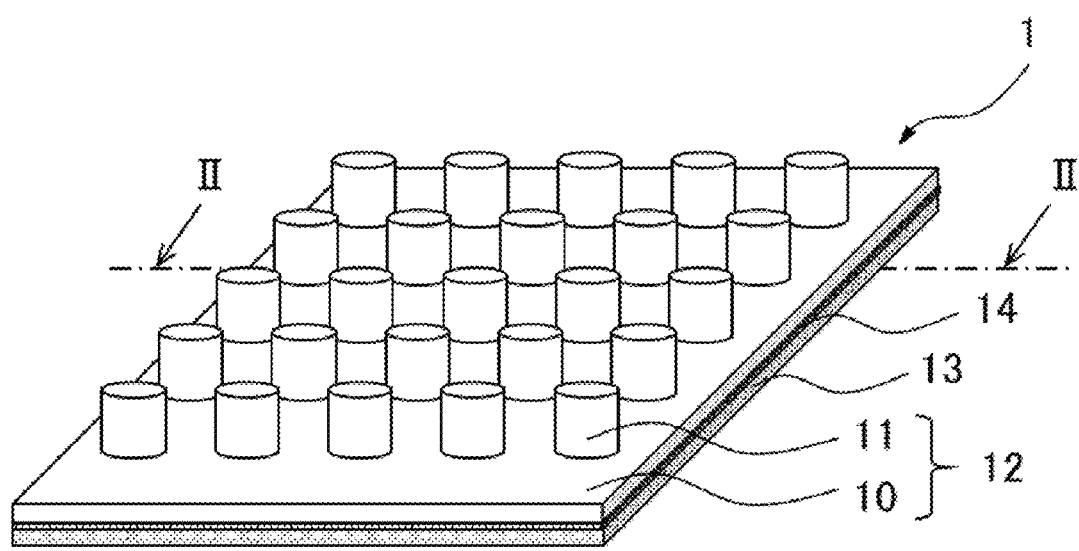
FIG. 1 is a schematic perspective view illustrating a sound insulating structure according to the present embodiment.

Embodiments of the present invention will now be described in detail; however, the following descriptions are merely examples (representative examples) of the embodiments of the present invention, and the present invention is not limited to the contents thereof within the gist of the present invention.

In the present specification, unless otherwise specified, the positional relationships such as vertical and lateral relationships are based on those illustrated in the respective drawings. Further, the dimensional ratio of a drawing is not limited to the one used in the drawing. In the present specification, for example, a numerical range expressed as "1 to 100" includes both the lower limit value "1" and the upper limit value "100". The same applies to such other numerical ranges as well.

Moreover, the term "plural" used herein means two or more.

<Sound Insulating Structure>

The sound insulating structure according to one embodiment of the present invention (hereinafter, also simply referred to as "sound insulating structure") is a sound insulating structure including, at least: a sound insulating member that includes a sheet-like sheet section and plural projections arranged on the sheet section; and an adhesive layer arranged on a surface of the sheet section on the opposite side of the side provided with the projections, and the sound insulating structure satisfies the following Formula (1):

$$E\_glue/I\_glue > 0.5 \times (E\_membrane/H) \quad (1)$$

E_glue (MPa): storage modulus of adhesive layer
I_glue (mm): average thickness of adhesive layer
E_membrane (MPa): storage modulus of sheet section and projections
H (mm): average height of sheet section and projections.

Embodiments of the present invention will now be described referring to the drawings. It should be noted here, however, that the below-described embodiments are merely examples for describing the present invention, and the present invention is not limited only to the below-described embodiments.

Further, unless otherwise specified, the terms "projection" and "resonant part" used herein compass all of plural projections and resonant parts, respectively.

Figure 2:
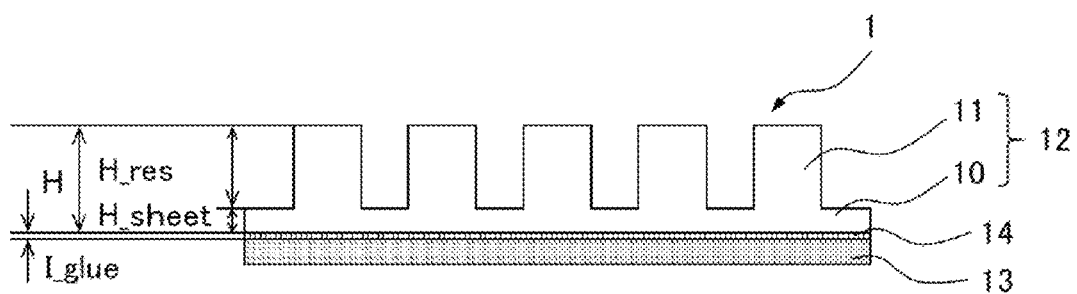
FIG. 2 is a cross-sectional view taken along a line II-II of FIG. 1.
Figure 12:
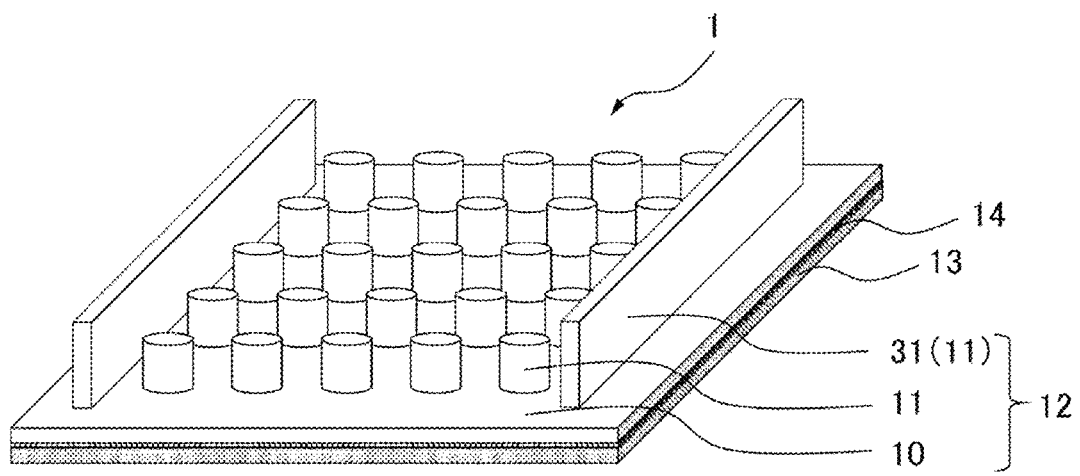
FIG. 12 is a schematic perspective view illustrating yet another sound insulating structure according to the present embodiment.
Figure 13:
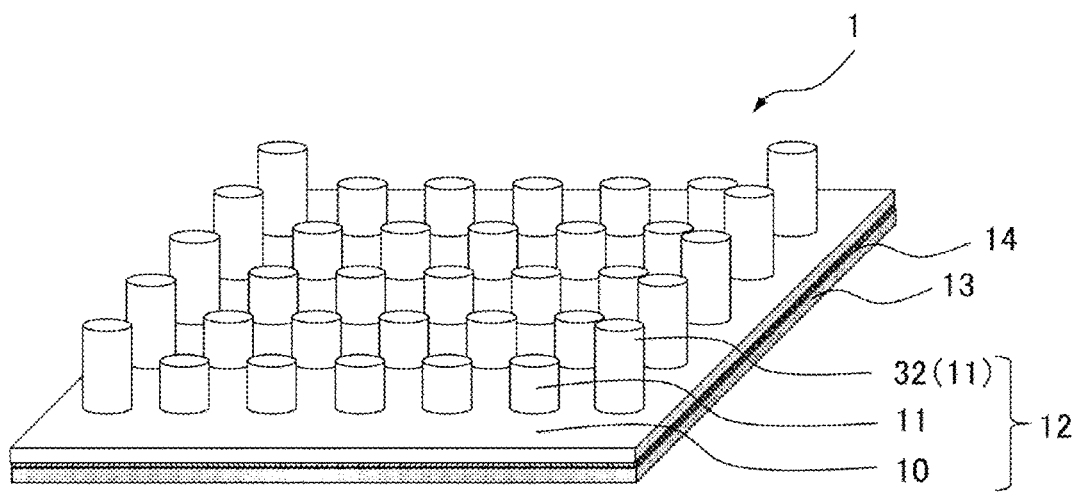
FIG. 13 is a schematic perspective view illustrating yet another sound insulating structure according to the present embodiment.
Figure 14:
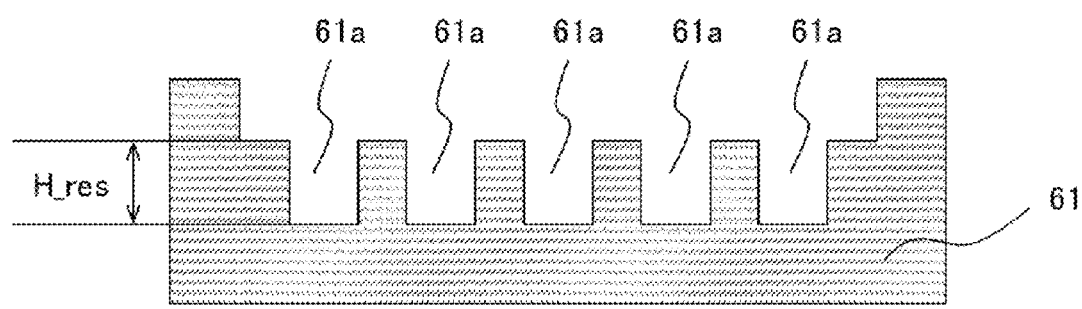
FIG. 14 is a drawing that illustrates one example of a sound insulating member production process.
Figure 15:
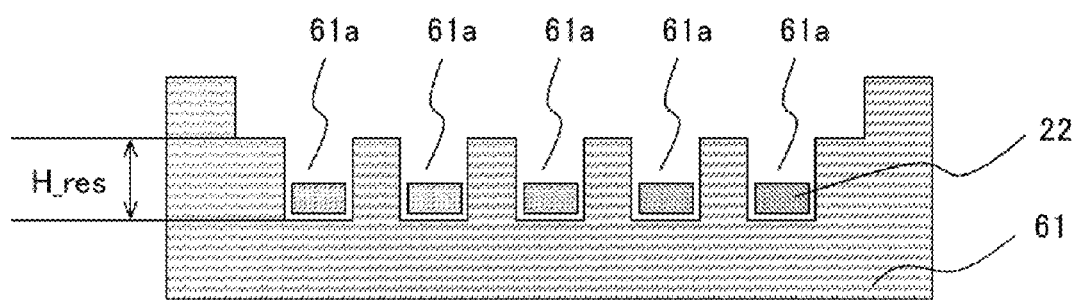
FIG. 15 is a drawing that illustrates one example of a sound insulating member production process.
Figure 16:
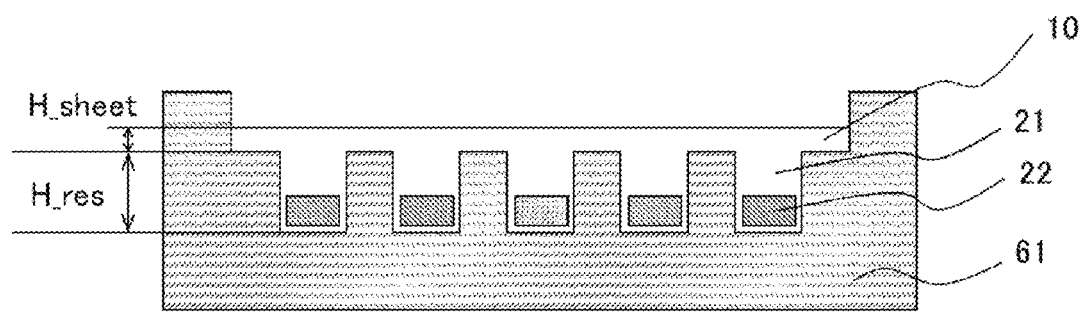
FIG. 16 is a drawing that illustrates one example of a sound insulating member production process.
Figure 17:
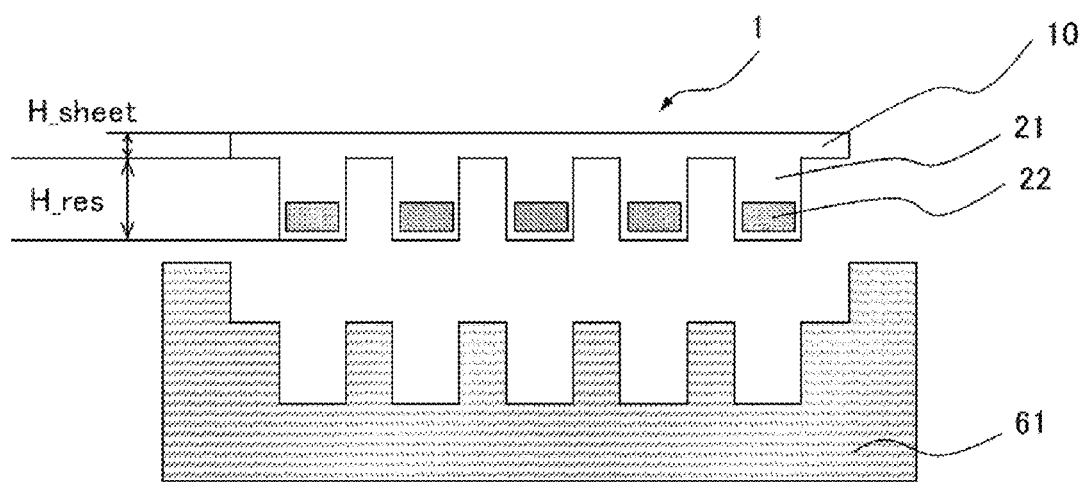
FIG. 17 is a drawing that illustrates one example of a sound insulating member production process.

The sound insulating structure preferably further includes an adherend to which the sound insulating member is adhered via the adhesive layer, in addition to the above-described constitution. FIGS. 1 and 2 are a schematic perspective view illustrating one mode of a sound insulating structure according to a first embodiment of the present invention in which the adherend is arranged (this sound insulating structure is hereinafter also referred to as "sound insulating structure 1"), and a cross-sectional view taken along a line II-II of FIG. 1, respectively. The sound insulating structure 1 includes: a sound insulating member 12 which has a sheet-like sheet section 10 and plural projections 11 arranged on the sheet section; an adherend 13; and an adhesive layer 14 which adheres the sound insulating member to the adherend 13. It is noted here that, in principle, the projections are constituted by resonant parts; however, the below-described protruding parts illustrated in FIGS. 12 and 13 are also included as constituents. In the following descriptions, the projections are also referred to as "resonant parts", except in the descriptions relating to the protruding parts. In FIGS. 12 and 13, the projections 11 and the protruding parts 31 are separately described as the resonant parts; however, protruding parts are included in the concept of projections.

In the sound insulating structure 1, for example, when a sound wave is input from a noise source existing on the side of the adherend 13, resonance occurs in the sheet section 10 and/or the resonant parts 11. This allows the existence of a frequency range in which the direction of a force acting on the adherend 13 and the direction of acceleration generated in the sheet section 10 and/or the resonant parts 11 are opposite to each other, and vibrations of a specific frequency are partially or entirely cancelled out, creating a complete acoustic band gap in which the vibrations of a specific frequency are almost completely absent. Accordingly, some or all of vibrations come to rest in the vicinity of the resonance frequency of the sheet section 10 and/or the resonant parts 11, as a result of which high sound insulating performance exceeding the law of mass can be obtained even when the sound insulating structure 1 is relatively lightweight. A sound insulating member utilizing this principle is called "acoustic metamaterial".

The resonance frequency of the resonant parts 11 can be easily controlled by, for example, adjusting the spring constant through modification of the shape, density distribution, or material (storage modulus or mass) of the resonant parts 11, or changing the mass of the below-described weight portions 22 illustrated in FIG. 3. In addition, the frequency band (acoustic band gap width and frequency position) can be controlled by modifying the material, thickness or the like of the sheet section 10. Therefore, the sound insulating structure 1 is excellent in terms of the degree of freedom in the selection of a sound insulating frequency as well as the degree of freedom in the design as compared to conventional sound insulating structures.

Further, since the sound insulating member 12 has a viscoelasticity, even when the adherend 13 is not flat having a curved surface or the like, the stretchable and flexible sheet section 10 can conform to the surface shape of the adherend 13, so that the sheet section 10 can be stably mounted on the adherend 13. Therefore, the sound insulating structure 1 of the present embodiment has superior ease of handling and versatility as compared to conventional sound insulating structures.

In the case of integrally molding the sheet section 10 and the resonant parts 11, a plurality of the resonant parts 11 (resonators) can be arranged at once; therefore, the productivity and the ease of handling are dramatically improved.

Further, when the sound insulating structure 1 has the below-described rib-like protruding parts 31 or cylindrical protruding parts 32 as illustrated in FIG. 12 or 13, since these protruding parts have a maximum height greater than that of the resonant parts 11, even if the sound insulating member 12 is wound in the form of a sheet or a plurality of the sound insulating members 12 are disposed on top of each other during the production of the sound insulating member 12, the protruding parts function as a spacer to prevent the resonant parts 11 from coming into contact with the backside of the sheet section 10. Accordingly, the sound insulating member 12 can be, easily, continuously produced and stored in a so-called roll-to-roll manner without causing manufacturing problems such as deformation, modification, cracking, detachment, and breakage of the resonant parts 11, so that the production rate is increased as compared to sheet-by-sheet batch production, and the productivity and the economic efficiency are thus improved.

Moreover, the sheet section and the resonant parts can be integrally molded and, since no bonded surface exists in this case, the amount of interface that may be fragile to an external force such as vibration or a change in the external environment such as temperature and humidity can be reduced, so that excellent durability is attained.

In the sound insulating structure, by satisfying the following Formula (1), superior sound insulating performance, specifically an effect that a shift in the frequency band where the sound insulating effect is generated is unlikely to occur, can be obtained.

$$E\_glue/l\_glue > 0.5 \times (E\_membrane/H) \tag{1}$$

Figure 5:
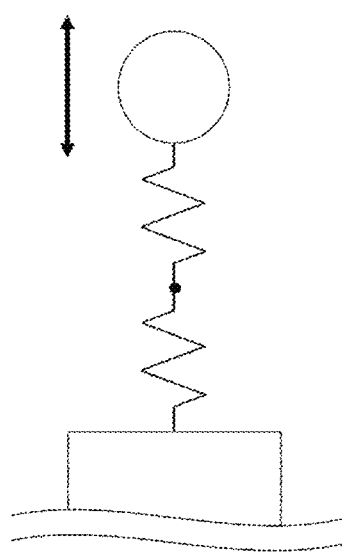
FIG. 5 is a drawing that illustrates a simplified model representing the operating principle of a sound insulating structure according to the present embodiment.

E_glue (MPa): storage modulus of adhesive layer
l_glue (mm): average thickness of adhesive layer
E_membrane (MPa): storage modulus of sheet section and projections
H (mm): average height of sheet section and projections The sound insulating performance in the present invention can be described using, as an operating principle, the simplified model illustrated in FIG. 5 which is composed of a resonator having spring parts as a unit. The arrow in FIG. 5 represents the direction of resonance. Further, in FIG. 5, the circle represents a weight having the weight of the projections; the square represents the adherend; the spring on the circle side represents a spring corresponding to the sheet section and the projections; and the spring on the square side represents a spring corresponding to the adhesive layer. In other words, a resonance phenomenon can be approximated to that of a series spring in which the spring constant of the sheet section and the projections is defined as $K_A$ and that of the adhesive layer is defined as $K_B$. A composite spring constant $K_{ALL}$ of the series spring, which is composed of the spring constant $K_A$ of resin portions constituting the resonant parts and the spring constant $K_B$ of the adhesive layer, can be expressed as the following Formula (S1). It is noted here that the following Formula (S1) assumes that the adhesive layer is sufficiently thin and the mass thereof is negligible.

$$K_{ALL} = 1/(1/K_A + 1/K_B) \tag{S1}$$

In terms of the design of a sheet member, the spring constant of the resin portions is $K_A$ and that of an adhered structure as a whole is $K_{ALL}$; therefore, a small $|K_A - K_{ALL}|$ value means that a variation in the spring constant from a design value is small. When a value (normalized spring constant) obtained by dividing the $|K_A - K_{ALL}|$ value by the original spring constant $K_A$ is defined as $\Delta K = |K_A - K_{ALL}|/K_A$, this gives $\Delta K = 1/(1 + (K_B/K_A))$, and it can be presumed that the value of $K_A/K_B$ is preferably larger than a certain value in order to reduce $\Delta K$.

Further, when $\Delta K$ is small, since the resonance frequency of the projections directly corresponding to a sound insulating band is expressed as $f = (K/m)^{1/2}$ (wherein, m represents the weight of the projections), this gives $\Delta f = (\Delta K/m)^{1/2}$, and it is seen that a reduction in $\Delta K$ leads to a smaller variation from a design frequency.

Figure 6:
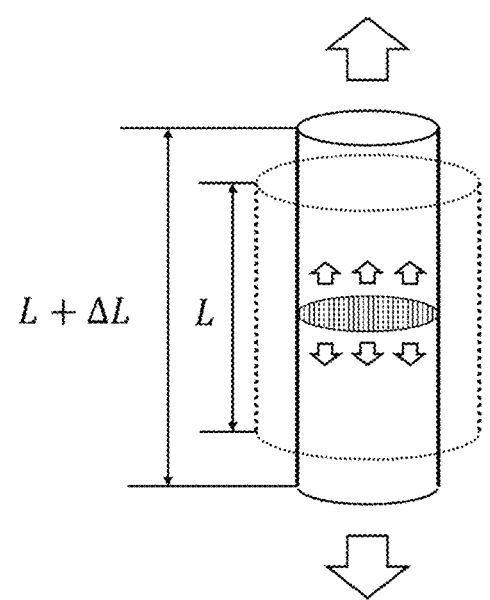
FIG. 6 is a drawing that illustrates a simplified model representing the operating principle of another sound insulating structure according to the present embodiment.

In order to clarify the correspondence of the above-described simplified model with the shape of the projections and the physical properties of the material, in accordance with the model illustrated in FIG. 6, it is assumed that a protruding part is a rod-like spring having a certain cross-sectional shape of a cylinder, a prism or the like. In this case, the relationship of a weight F applied to the rod-like spring and an elongation L is represented by the following Formula (S2). The arrow in FIG. 6 represents the direction of resonance.

$$\Delta F = (EA\Delta L/L) \tag{S2}$$

E (MPa): storage modulus

A (mm$^2$): cross-sectional area of projection

L (mm): height of resin spring portion

ΔL (mm): elongation when weight F is applied

In Formula (S2) above, a rod-like spring constant K is expressed as K=EA/L based on the relationship of ΔF/ΔL=K. Accordingly, it can be denoted as $E_B A_B/L_B > \beta E_A A_A/L_A$ when $K_B/K_A > \beta$ (β is a constant) is satisfied.

When the projection of the spring part has a constant cross-sectional area, a relationship of $A_A = A_B$ is given; therefore, it can be surmised that, ultimately, the relationship between the storage modulus and the height or thickness in the resin portions and the adhesive part preferably satisfies the following Formula (S3):

$$E_B/L_B > \beta E_A/L_A \quad (S3)$$

The relationship of Formula (S3) can be calculated and verified more precisely based on a finite element method; therefore, in Examples of the present invention, calculation based on a finite element method was employed.

From the results of simulations based on a finite element method, the present inventors discovered that β≥0.5 is an important condition for limiting a frequency shift to be 20% or less. By applying an adhesive and a structure that have a material and a shape satisfying this relationship, a high-quality product in which a shift in the designed sound insulating frequency of a sheet section is small can be provided.

When the above-described Formula (1) is expressed as the following Formula (1)', Formula (1) preferably satisfies Formula (1)', and β in Formula (1)' is not particularly limited as long as it is 0.5 or larger; however, from the standpoint of inhibiting a shift in the frequency band where a sound insulating effect is generated, β is preferably 5, more preferably 50, still more preferably 100. It is not particularly necessary to set an upper limit; however, β is usually 50,000 or less.

$$E\_glue/I\_glue > \beta \times (E\_membrane/H) \quad (1)'$$

In Formula (1)', E_glue, I_glue, E_membrane, and H have the same meanings as in the above-described Formula (1).

In this manner, by controlling the storage modulus of the adhesive layer relative to the average thickness of the adhesive layer to be higher by at least a certain level than the storage modulus of the sheet section and the projections relative to the average height of the sheet section and the projections, vibration of the adherend is sufficiently transferred to the sound insulating member, so that a sound insulating effect can be exerted at an intended frequency. When the adhesive layer has a low storage modulus or a large average thickness, i.e. when the left side of Formula (1) is small, movement of the adhesive layer caused by vibration of the adherend is no longer negligible, which consequently makes it difficult to obtain a sound insulating effect at an intended frequency.

A technology of using an adhesive for arranging a sound insulating material or the like has been utilized as in Patent Document 2 and the like; however, it is common to reduce the storage modulus of the adhesive layer for the purpose of impact mitigation. When the adhesive layer has a low storage modulus, since this makes the left side of Formula (1) small, it is generally difficult to obtain a sound insulating effect at an intended frequency. Accordingly, Formula (1) is likely to be satisfied when the storage modulus of the adhesive layer is higher than 10 MPa, although this also depends on the relationship of the storage modulus with other values.

Constituents such as the sound insulating member, the adherend, and the adhesive layer will now be described in detail.

[Sound Insulating Member]

The sound insulating member 12 includes: a sheet-like sheet section 10; and plural resonant parts 11 arranged on one side of the sheet section 10.

The sheet section 10 and the resonant parts 11 may be made of the same material or different materials. The sheet section 10 and the resonant parts 11 may be formed in an integrated manner, or may be separately formed and then combined.

(Storage Modulus E_membrane)

The storage modulus (E_membrane) of the sheet section 10 and the resonant parts 11 is not particularly limited as long as the above-described Formula (1) is satisfied; however, from the standpoint of obtaining high sound insulating performance, it is usually not less than 0.5 MPa, preferably not less than 1.0 MPa, more preferably not less than 2.0 MPa, still more preferably not less than 3.0 MPa, but usually 500 MPa or less, preferably 300 MPa or less, more preferably 200 MPa or less, still more preferably 100 MPa or less.

The storage modulus (E_membrane) of the sheet section 10 and the resonant parts 11 refers to a composite storage modulus calculated from the spring constant of the sheet section 10 and that of the resonant parts 11. A method of calculating the composite storage modulus will now be described.

A spring constant (K_membrane) of the sheet section 10 and the resonant parts 11 is a spring constant of a combination of the sheet section 10 and the resonant parts 11. When the spring constant of the resonant parts is defined as K_res and that of the sheet section is defined as K_sheet, the composite spring constant (K_membrane) for each resonant part can be determined using the following Formula (S4):

$$K\_membrane = 1/(1/K\_res + 1/K\_sheet) \quad (S4)$$

In this case, a composite storage modulus (E'_membrane) of the sheet section and each resonant part can be determined from the relationship represented by the following Formula (S5). The composite storage modulus (E'_membrane) may also be determined by measuring each parameter separately and ultimately combining the thus measured parameter values to perform calculation using the following Formula (S5). A method of calculating K_res and K_sheet will be described later.

$$K\_membrane = E'\_membrane \times (A/H\_membrane) \quad (S5)$$

E'_membrane: storage modulus of each combination of sheet section and projection (composite storage modulus of each member consisting of sheet section and resonant part)

A: cross-sectional area of projection (resonant part)

H_membrane: combined height of sheet section and resonant part (H_res+H_sheet)

An ultimate composite storage modulus (E_membrane) is a value obtained by determining the composite storage modulus (E'_membrane) for each of plural projections as described above and calculating an average value thereof.

When, in the sound insulating member, the sheet section 10 is entirely made of a single homogeneous material and has a uniform thickness and all of the resonant parts 11 are made of the same material and have the same thickness, it is not necessary to determine the composite spring constant for each of the resonant parts as described above, and the value of E'_membrane calculated from the composite spring constant determined for an arbitrarily selected single resonant part can be adopted as E_membrane.

Further, when the sheet section 10 and the resonant parts 11 are made of the same material, the value of the composite spring constant determined for any part of either the sheet section 10 or the resonant parts 11 can be adopted as K_membrane.

It is noted here that the above-described various storage moduli can be measured by the below-described method, and they may be directly evaluated using a material collected from the sound insulating member, or indirectly evaluated using test pieces produced under the same production conditions.

When the sound insulating member 12 has the below-described weight portions 22, the storage modulus of the weight portions 22 is not taken into consideration in the calculation of K_membrane. This is because, since the weight portions are basically rigid bodies, resonance in the present invention is affected only by those parts providing flexibility, namely the sheet section 10 and the below-described base portions 21.

The storage moduli can be controlled by modifying the molecular weight or the bonding type of a resin or the like, or adding a filler and, generally speaking, the storage moduli are increased with an increase in the molecular weight, an increase in the bonding strength, or an addition of a filler. Further, for example, when a molded article is produced by blending a resin having a low storage modulus and a resin having a high storage modulus, the storage modulus of the molded article can be controlled by adjusting the blend ratio of these resins.

The spring constant (K_res) of the resonant parts and the spring constant (K_sheet) of the sheet section can be determined from the storage modulus of the resonant parts and that of the sheet section based on the following Formulae (S6) and (S7), respectively.

$$K\_res = E\_res \times A\_res / L\_res \tag{S6}$$

$$K\_sheet = E\_sheet \times A\_sheet / L\_sheet \tag{S7}$$

In these Formulae, K_res (K_sheet): spring constant (–) of resonant parts (sheet section), E_res (E_sheet): storage modulus (MPa) of resonant parts (sheet section), A_res (A_sheet): cross-sectional area (mm$^2$) of resonant parts (sheet section), and L_res (L_sheet): height (mm) of resonant parts (sheet section).

The storage moduli E_res and E_sheet of the sheet section and the resonant parts in the above-described Formulae (S6) and (S7), respectively, can be measured using an indentation hardness tester in accordance with the below-described method. In the present specification, the storage moduli are measured in a measurement atmosphere having a temperature of 23° C. and a humidity of 50% RH.

The storage modulus of the adhesive layer can also be measured by the below-described method using an indentation hardness tester, and it may be directly evaluated using a material collected from the sound insulating structure, or indirectly evaluated using test pieces produced under the same production conditions.

The measurement using an indentation hardness tester is performed in accordance with ISO14577-1. A Vickers indenter can be used as an indenter to perform the evaluation.

Figure 7:
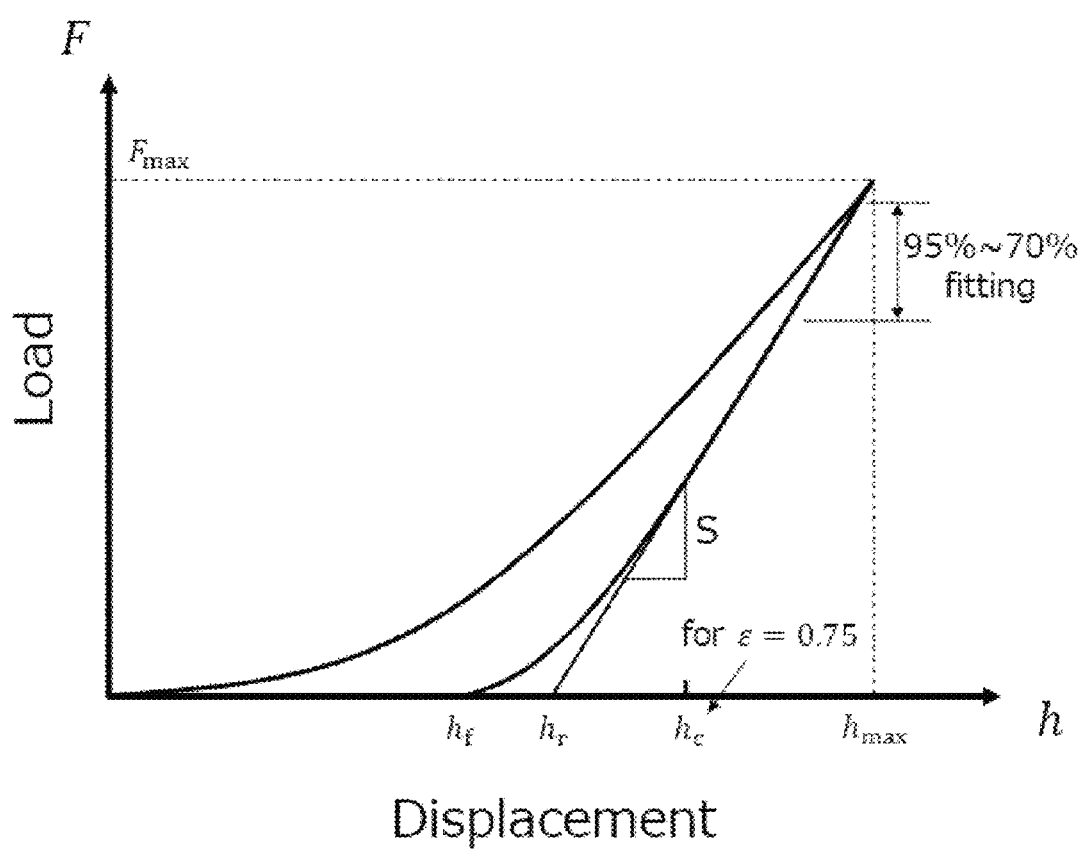
FIG. 7 is a graph showing a load-displacement curve obtained by measurement using an indentation hardness tester.

The measurement using an indentation hardness tester yields such a load-displacement curve as shown in FIG. 7. The symbols in FIG. 7 are as follows.

$F_{max}$: maximum test force $h_r$: intersection of tangent line of unloading curve with indentation depth $h_f$: depth of permanent depression after unloading of test force $h_{max}$: maximum indentation depth at $F_{max}$ A ratio $h_f/h_{max}$ of the maximum indentation depth at $F_{max}$ ($h_{max}$) and the depth of a permanent depression after unloading of the test force ($h_f$) can be used as an index of the residual strain energy.

For an analysis of $E_{IT}$, the slope S of the tangent line drawn on the unloading curve is used.

The composite elastic modulus $E_r$ of the indenter and a sample is represented by the following Formula (L):

$$E_r = \frac{S\sqrt{\pi}}{2\sqrt{A_p(h_c)}} \tag{L}$$

$h_c$: contact indentation depth of indenter on sample at $F_{max}$ $A_p(h_c)$: projected contact cross-sectional area of indenter at depth $h_c$ (in accordance with ISO14577-2)

When the indentation elastic modulus of a measurement object (E_res or E_sheet) is defined as $E_{IT}$, it is represented by the following Formula (M):

$$E_{IT} = \frac{1-(v_s)^2}{\frac{1}{E_r} - \frac{1-(v_i)^2}{E_i}} \tag{M}$$

$E_i$: elastic modulus of indenter (usually, a diamond-made indenter having a known value is used)

$E_r$: composite elastic modulus of indenter and sample (elastic modulus measured by experiment)

$v_i$: Poisson ratio of indenter (usually, a diamond-made indenter having a known value is used)

$v_s$: Poisson ratio of sample (a known value is used; 0.3 to 0.5 in the case of an ordinary resin)

It is noted here that the measurement of storage modulus by the above-described method can also be applied to the measurement of the storage moduli of the below-described base portions, weight portions, protruding parts, adhesive, and adherend. When measuring the storage modulus of any of the above-described materials by this method, it is preferred that the surface to be measured be horizontally pasted and immobilized onto a flat measurement substrate (e.g., a quartz glass or a glass slide), which is not deformed by indentation, using a commercially available instant adhesive or the like, and it is also preferred that the amount of indentation in the measurement be about $^1/_{10}$ or less of the thickness of the material to be measured. When the amount of indentation is $^1/_{10}$ or more of the thickness of the material to be measured, such a measurement condition is not appropriate since the above-described measured value is affected by the hardness of the substrate on which the material is immobilized.

(Height H)

The height H of the sheet section 10 and the resonant parts 11 is not particularly limited as long as the above-described Formula (1) is satisfied; however, from the standpoint of obtaining high sound insulating performance in the audible range, it is usually not less than 0.5 mm, preferably not less than 1.0 mm, more preferably not less than 2.0 mm, still more preferably not less than 3.0 mm, but usually 50.0 mm or less, preferably 30.0 mm or less, more preferably 25.0 mm or less, still more preferably 20.0 mm or less.

The height H of the sheet section and the resonant parts is a total of the height of the sheet section 10 and the height of the respective resonant parts 11. Specifically, when the height of each resonant part is defined H_res and the thickness of the sheet section immediately beneath the resonant part is defined as H_sheet, a combined height H' is calculated for each resonant part using the following Formula (B), and the height H is determined as an average value of the thus calculated values of the combined height H'.

$$H'=H\_res+H\_sheet \quad (B)$$

It is noted here that, when the height varies within a single resonant part, an average value thereof is used.

When the sheet section entirely has a uniform thickness and all of the resonant parts have the same height in the sound insulating member 12, it is not necessary to determine the combined height for each of the resonant parts as described above, and the combined height determined for an arbitrarily selected single resonant part can be adopted as H.

When the sound insulating member 12 has the below-described weight portions 22, the height of a portion on the tip side than each weight portion 22 is not taken into consideration in the calculation of H. In other words, when the sound insulating member 12 does not have any weight portion 22, H is a height from the bottom of the sheet section 10 to the top of the resonant parts 11, while when the sound insulating member 12 has the weight portions 22, H is a height from the bottom of the sheet section 10 to the bottom of the weight portions 22. This is because, when the sound insulating member 12 has the weight portions 22, these weight portions are made of a very hard material such as a metal or a ceramic and are thus rigid bodies that hardly elongate in the vicinity of a sound insulating frequency. Accordingly, resonance is affected only by those parts that cause moderate elongation and strain in the vicinity of a design frequency, namely the sheet section 10 and the below-described base portions 21.

[Sheet Section]

The sheet section 10 is not particularly limited as long as it is in the form of a sheet and exhibits moderate elongation and strain in the vicinity of a designed sound insulating frequency, and the sheet section 10 may have a flat surface or a curved surface. When the sheet section 10 is to be arranged on an adherend, the sheet section 10 can be selected as appropriate in accordance with the shape of the adherend.

Figure 8:
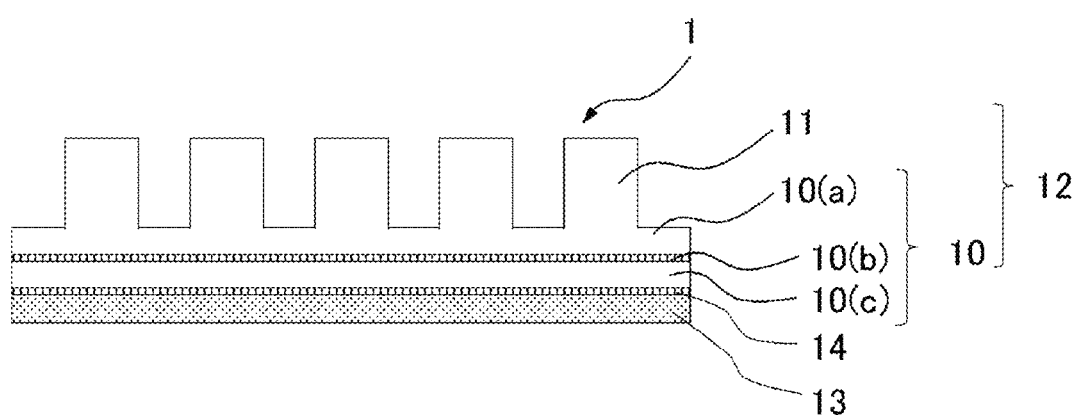
FIG. 8 is a cross-sectional view of a sound insulating structure according to the present embodiment.

The term "sheet section" used herein refers to a sheet-like member that maintains projections on one side and, as described below, may be constituted by a single layer, or two or more layers. Further, the term "sheet section" refers to the entirety of a part having a sheet shape and, for example, as illustrated in FIG. 8, when the sheet section is constituted by plural layers and configured to include a layer 10(b) formed of an adhesive used for adhering two layers (10(a) and 10(c) in FIG. 8) in the plural layers, the sheet-shaped part constituted by the layers 10(a), 10(b) and 10(c) is the sheet section, and a layer 14, which is formed of an adhesive and arranged adjacent to one of the two surfaces of the layer 10(c) that is on the opposite side of the projections, is the adhesive layer in Formula (1). In other words, in the case of FIG. 8, the layer 10(a) is not the entirety of the sheet section, and the layer 10(b) is not the adhesive layer in Formula (1).

Usually, the designed sound insulating frequency is in the audible frequency range and is thus 20 to 20,000 Hz. As a sheet material that exhibits moderate elongation and strain in this frequency range, a polymer material such as a resin or a rubber is preferred.

The sheet section is capable of functioning as a vibrator (resonator) that vibrates at a certain frequency when a sound wave is input from a noise source.

The material constituting the sheet section 10 preferably contains at least one selected from the group consisting of thermosetting or photocurable elastomers and thermoplastic elastomers.

When the sheet section 10 is cast-molded using a metal mold or the like, it is necessary to fill cavities on the surface of the mold with an elastomer, and the elastomer is preferably a photocurable elastomer since it can fill the cavities in the state of an uncured liquid having a relatively low viscosity and thereby improve the filling rate.

Specific examples of the material constituting the sheet section 10 include:

thermosetting resin-based elastomers, for example, vulcanized thermosetting resin-based elastomers such as chemically-crosslinked natural rubber and synthetic rubber, urethane-based thermosetting resin-based elastomers, silicone-based thermosetting resin-based elastomers, fluorine-based thermosetting resin-based elastomers, and acrylic thermosetting resin-based elastomers;

photocurable elastomers, such as acrylic photocurable elastomers, silicone-based photocurable elastomers, and epoxy-based photocurable elastomers; and thermoplastic elastomers, such as olefin-based thermoplastic elastomers, styrene-based thermoplastic elastomers, polyvinyl chloride-based thermoplastic elastomers, urethane-based thermoplastic elastomers, ester-based thermoplastic elastomers, amide-based thermoplastic elastomers, silicone-based thermoplastic elastomers, and acrylic thermoplastic elastomers.

Specific examples of the thermosetting or photocurable elastomers include, but not particularly limited to: rubbers, such as natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, and modified products thereof. These elastomers may be used singly, or in combination of two or more thereof.

Further, among these elastomers, preferred are natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, and modified products thereof, and silicone rubber, acrylic rubber, and modified products thereof are more preferred. By using any of these materials, excellent heat resistance and excellent cold resistance tend to be obtained.

The sheet section 10 may contain a variety of additives, such as a flame retardant, an antioxidant, a plasticizer, and a coloring agent.

The flame retardant is an additive that is incorporated to make flammable materials unlikely to burn or ignite. Specific examples thereof include, but not particularly limited to: bromine compounds, such as pentabromodiphenyl ether, octabromodiphenyl ether, decabromodiphenyl ether, tetrabromobisphenol A, hexabromocyclododecane, and hexabromobenzene; phosphorus compounds such as triphenyl phosphate; chlorine compounds such as chlorinated paraffin;

antimony compounds such as antimony trioxide; metal hydroxides such as aluminum hydroxide; nitrogen compounds such as melamine cyanurate; and boron compounds such as sodium borate.

The antioxidant is an additive that is incorporated to inhibit oxidative degradation. Specific examples thereof include, but not particularly limited to: phenolic antioxidants, sulfur-based antioxidants, and phosphorus-based antioxidants.

The plasticizer is an additive that is incorporated to improve flexibility and weather resistance. Specific examples thereof include, but not particularly limited to: phthalic acid esters, adipic acid esters, trimellitic acid esters, polyesters, phosphoric acid esters, citric acid esters, sebacic acid esters, azelaic acid esters, maleic acid esters, silicone oils, mineral oils, vegetable oils, and modified products thereof.

Examples of the coloring agent include pigments and dyes.

These additives may be used singly, or in combination of two or more thereof.

In FIG. 1, the sheet section 10 is formed in a square shape in a plan view; however, the shape of the sheet section 10 is not particularly limited thereto. The sheet section 10 can take any shape in a plan view, examples of which include: polygonal shapes, such as a triangular shape, an oblong shape, a rectangular shape, a trapezoidal shape, a rhombic shape, a pentagonal shape, and a hexagonal shape; circular shapes; elliptical shapes; and irregular shapes that are not classified into the above-described shapes. From the standpoints of improvement in the elasticity, weight reduction and the like, the sheet section 10 may have a notch, a punched hole or the like at any place as long as the properties of the sheet section 10 as an acoustic metamaterial are not impaired.

The thickness H_sheet of the sheet section 10 is not particularly limited as long as the height H of the sheet section and the projections is in a range that satisfies the above-described Formula (1). Since a frequency band (acoustic band gap width and frequency position) in which high sound insulating performance is exerted can also be controlled based on the thickness of the sheet section 10, it is possible to set the thickness of the sheet section 10 as appropriate such that the acoustic band gap matches a desired sound insulating frequency range. When the sheet section 10 has a large thickness, the acoustic band gap tends to be narrow and shift towards the low frequency side. Meanwhile, when the sheet section 10 has a small thickness, the acoustic band gap tends to be wide and shift towards the high frequency side.

From the standpoints of sound insulating performance, mechanical strength, flexibility, ease of handling and the like, the thickness H_sheet of the sheet section 10 is preferably 10 μm or greater, more preferably 50 μm or greater, still more preferably 100 μm or greater. Further, the thickness of the sheet section 10 is preferably 2 mm or less, more preferably 1 mm or less, still more preferably 500 μm or less.

From the standpoint of reducing the temperature dependence of the sound insulating performance at low temperatures, the sheet section 10 preferably has a glass transition temperature of 0° C. or lower. A lower glass transition temperature of the sheet section 10 leads to a higher cold resistance and a lower temperature dependence of the storage modulus around 0° C., which tends to make the sound insulating performance hardly dependent on the ambient temperature. The glass transition temperature of the sheet section 10 is more preferably −10° C. or lower, still more preferably −20° C. or lower, particularly preferably −30° C. or lower. It is noted here that, in the present specification, the glass transition temperature of the sheet section 10 means a peak temperature of loss tangent in the above-described dynamic viscoelasticity measurement at a frequency of 10 Hz, particularly, the temperature dependence measurement.

The sheet section may be constituted by two or more layers, and sheets may be adhered with each other by an adhesive layer. In this case, the adhesive layer formed between the sheet is regarded as a single layer in the sheet sections. For example, when a sheet section X and a sheet section Y are formed sandwiching an adhesive layer Z, the composite spring constant of the whole sheet section consisting of a total of three layers can be considered, and it is represented by the following formulae. It is noted here that the following formulae assume that each layer is sufficiently thin relative to protruding parts and the mass thereof is negligible.

$$K_{sheet} = 1/(1/K_X + 1/(1/K_Z + 1/K_Y))$$

$$L_{sheet} = L_X + L_Y + L_Z$$

In the above formulae, $K_{Sheet}$ (−): composite spring constant of whole sheet section; $K_X$ and $K_Y$ (−): spring constants of sheet sections X and Y, respectively; $K_Z$ (−): spring constant of adhesive layer Z; $L_{Sheet}$ (mm): height of whole sheet section; $L_X$ and $L_Y$ (mm): heights of sheet sections X and Y, respectively; and $L_X$ (mm): height of adhesive layer Z.

From the storage modulus and the thickness of the respective three layers, the relationship of parameters can be determined in the same manner as in the discussion of the composite spring constant of the protruding parts and the sheet section. That is, the storage modulus of the whole sheet section can be calculated based on the following formula:

$$K_{sheet} = E_{Sheet} \times A/L_{Sheet}$$

In this formula, A represents the cross-sectional area of the whole sheet section. Further, K_membrane and E_membrane of a member consisting of the sheet section and the resonant parts can be calculated using the value of $K_{sheet}$. Generally, this also applies to those cases where the member has four or more layers. When the member has two or more layers, separately prepared sheet sections may be combined by curing a thermosetting elastomer, a photocurable elastomer or the like on each section, without using any adhesive.

In the present specification, when a sheet has two or more layers, among the layers constituting the sheet, a layer farthest away from projections, namely the layer on the opposite side of the layer provided with projections, may be referred to as "support".

This support which supports projections and other sheet sections is not particularly limited, and examples of a preferred material thereof include: organic materials, such as polyacrylonitrile, polyethylene terephthalate, polybutylene terephthalate, polyethylene naphthalate, polyvinyl chloride, polyvinylidene chloride, polychlorotrifluoroethylene, polyethylene, polypropylene, polystyrene, cyclic polyolefin, polynorbornene, polyether sulfone, polyether ether ketone, polyphenylene sulfide, polyarylate, polycarbonate, polyamide, polyimide, triacetylcellulose, polystyrene, epoxy resins, acrylic resins, and oxazine resins; and composite materials containing a metal (e.g., aluminum, stainless steel, iron, copper, zinc, or brass), an inorganic glass, inorganic particles, or fibers in the above-exemplified organic materials. Particularly, from the standpoints of sound insulating performance, rigidity, moldability, cost and the like, the support is preferably at least one selected from the group consisting of photocurable resin sheets, thermosetting resin sheets, thermoplastic resin sheets, metal plates, and alloy plates. The thickness of the support is not particularly limited; however, from the standpoints of sound insulating performance, rigidity, moldability, weight reduction, cost and the like, it is usually preferably 0.1 mm or more and 50 mm or less.

[Projections (Resonant Parts)]

The projections (resonant parts) 11 are not particularly limited as long as they are provided in a plural number on one side of the sheet section 10 and exhibits moderate elongation and strain in the vicinity of a designed sound insulating frequency. The resonant parts 11 each function as a vibrator (resonator) that vibrates at a certain frequency when a sound wave is input from a noise source.

The arrangement, number, size and the like of the resonant parts 11 can be set as appropriate in accordance with the desired performance and are not particularly limited. The resonant parts 11 are arranged in contact with one sheet surface of the sheet section 10. For example, in FIG. 1, plural resonant parts 11 are arranged at regular intervals in a lattice pattern; however, the arrangement of the resonant parts 11 is not particularly limited thereto. For example, plural resonant parts 11 may be arranged in a staggered manner or a random manner. The mechanism of sound insulating by the sound insulating member according to the present embodiment does not utilize Bragg scattering as in so-called phononic crystals; therefore, the resonant parts 11 do not necessarily have to be arranged at regular and periodic intervals.

A material constituting the resonant parts 11 is not particularly limited, and the conditions thereof are the same as those described above for the material used in the sheet section 10. From the standpoints of production cost and ease of production, the material of the resonant parts 11 and that of the sheet section 10 are preferably the same.

The number of the resonant parts 11 to be arranged per unit area is not particularly limited as long as the resonant parts 11 can be arranged such that the resonant parts 11 do not interfere with each other by, for example, coming into contact with each other.

The maximum number of the resonant parts 11 per unit area varies depending on the shape and the like of the resonant parts 11; however, for example, when the resonant parts 11 have a cylindrical shape whose height direction is aligned parallel to the sheet normal direction and which has a cylinder cross-sectional diameter of 1 cm, the maximum number of the resonant parts 11 is preferably 100 or less per 10 cm$^2$.

For example, when the resonant parts 11 have a cylindrical shape whose height direction is aligned parallel to the sheet normal direction and which has a cross-sectional diameter of 1 cm, the minimum number of the resonant parts 11 per unit area is preferably not less than 2, more preferably not less than 10, still more preferably not less than 50, per 10 cm$^2$. When the number of the resonant parts 11 is equal to or more than the above-described preferred lower limit, superior sound insulating performance tends to be obtained. Meanwhile, when the number of the resonant parts 11 is equal to or less than the above-described preferred upper limit, a reduction in the weight of the whole sheet can be easily achieved.

The height H_res of the resonant parts 11 in the normal direction of the sheet section 10 is not particularly limited as long as the height H of the sheet section and the projections is in a range that satisfies the above-described Formula (1). From the standpoints of ease of molding, improvement of the productivity and the like, the height H_res is preferably 10 μm or greater, more preferably 100 μm or greater, still more preferably 1 mm or greater. Further, the height H_res is preferably 20 mm or less, more preferably 15 mm or less, still more preferably 10 mm or less, yet still more preferably 8 mm or less, yet still more preferably 5 mm or less, particularly preferably 3 mm or less. By controlling the height H_res to be in the above-described range, winding and lamination of the sheet section 10 provided with the resonant parts 11 (i.e. the sound insulating member 12) are made easier, and this enables to produce the sound insulating member in a so-called roll-to-roll manner and store the sound insulating member in the form of a roll, so that the productivity and the economic efficiency tend to be improved.

Further, the resonant parts 11 are not required to all have the same height in the normal direction of the sheet section 10, and may have different heights. When the resonant parts have different heights, for example, an effect of expanding the frequency range in which sound insulating performance is exerted may be obtained. In this case, as described above, the height H is an average height of plural resonant parts.

Figure 3:
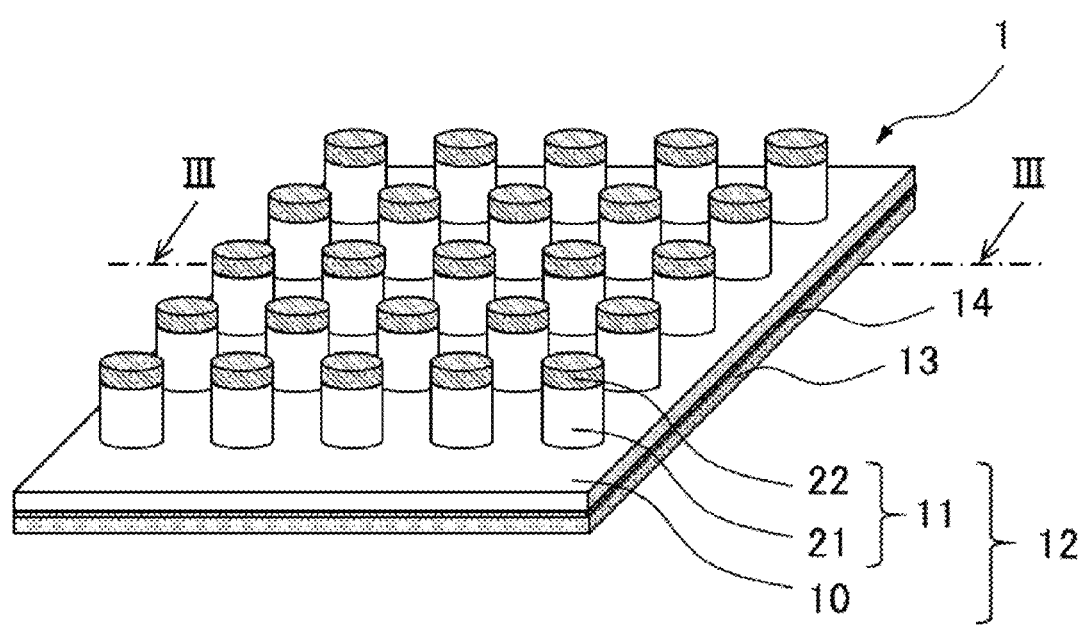
FIG. 3 is a schematic perspective view illustrating another sound insulating structure according to the present embodiment.

As illustrated in FIG. 3, the resonant parts 11 may each be constituted by a composite structure that includes: a base portion 21; and a weight portion 22 which is supported on the base portion 21 and has a larger mass than the base portion 21. Each resonant part 11 effectively functions as s resonator having a resonance frequency determined from the mass of the weight portion 22 acting as a weight and the spring constant of the base portion 21 acting as a spring. The base portion and the weight portion will now be described in detail.

(Base Portions)

The base portion 21 is provided in a plural number in contact with the sheet surface of the sheet section 10. An outer shape of the base portions 21 is not particularly limited, and the base portions 21 can take any shape, examples of which include: polygonal prism shapes, such as a triangular prism shape, a rectangular prism shape, a trapezoidal prism shape, a pentagonal prism shape, and a hexagonal prism shape; cylindrical shapes; elliptic cylinder shapes; truncated pyramid shapes; truncated cone shapes; pyramid shapes; cone shapes; hollow tubular shapes; branched shapes; and irregular shapes that are not classified into the above-described shapes. The base portions 21 can also be formed in a columnar shape that has a varying cross-sectional area and/or cross-sectional shape depending on the height position.

Further, the plural base portions 21 provided in contact with the sheet surface may be identical or different from each other in terms of shape and height.

A material of the base portions 21 is not particularly limited as long as the above-described required characteristics are satisfied. Examples of the material include resin materials, and the material may be, for example, at least one selected from the group consisting of thermosetting or photocurable elastomers, thermoplastic elastomers, thermosetting or photocurable resins, and thermoplastic resins.

As the conditions of the thermosetting or photocurable elastomers and the thermoplastic elastomers, those exemplified above for the sheet section 10 can be applied.

From the standpoints of production cost and ease of production, the material of the base portions 21 and that of the sheet section 10 are preferably the same.

Examples of the thermosetting or photocurable resins include acrylic thermosetting resins, urethane-based thermosetting resins, silicone-based thermosetting resins, and epoxy-based thermosetting resins. Examples of the thermoplastic resins include polyolefin-based thermoplastic resins, polyester-based thermoplastic resins, acrylic thermoplastic resins, urethane-based thermoplastic resins, and polycarbonate-based thermoplastic resins.

Specific examples of these resins include, but not particularly limited to: rubbers, for example, vulcanized rubbers such as chemically-crosslinked natural rubber and synthetic rubber, isoprene rubber, butadiene rubber, styrene-butadiene rubber, chloroprene rubber, nitrile rubber, polyisobutylene rubber, ethylene propylene rubber, chlorosulfonated polyethylene rubber, acrylic rubber, fluorine rubber, epichlorohydrin rubber, polyester rubber, urethane rubber, silicone rubber, and modified products thereof; and polymers, such as polyacrylonitrile, polyethylene terephthalate, polybutylene terephthalate, polyvinyl chloride, polychlorotrifluoroethylene, polyethylene, polypropylene, polynorbornene, polyether ether ketone, polyphenylene sulfide, polyarylate, polycarbonate, polystyrene, epoxy resins, and oxazine resins. These resin materials may be used singly, or in combination of two or more thereof.

The base portions 21 may each be a porous body that contains pores (gas such as air) in any of the above-described resin materials. Further, the base portions 21 may contain a liquid material, such as a mineral oil, a vegetable oil, or a silicone oil. When the base portions 21 contain a liquid material, from the standpoint of inhibiting leakage of the liquid material to the outside, the liquid material is desirably enclosed in the resin material.

Among the above-described materials, the material of the base portions 21 is preferably the same as that of the above-described sheet section 10, and it is particularly preferably an elastomer. When the sheet section 10 and the base portions 21 contain the same elastomer, the sheet section 10 and the base portions 21 can be easily integrally molded, so that the productivity can be dramatically improved. In other words, in a particularly preferred mode, the sheet section 10 and the resonant parts 11 (base portions 21) are in the form of an integrally molded article in which the sheet section 10 and the resonant parts 11 (base portions 21) both contain at least one selected from the group consisting of thermosetting or photocurable elastomers and thermoplastic elastomers.

Specific examples of the elastomers include, but not particularly limited to: vulcanized rubbers such as chemically-crosslinked natural rubber and synthetic rubber, isoprene rubber, butadiene rubber, styrene-butadiene rubber, chloroprene rubber, nitrile rubber, polyisobutylene rubber, ethylene propylene rubber, chlorosulfonated polyethylene rubber, acrylic rubber, fluorine rubber, epichlorohydrin rubber, polyester rubber, urethane rubber, silicone rubber, modified products thereof; and polymers, such as polyacrylonitrile, polyethylene terephthalate, polybutylene terephthalate, polyvinyl chloride, polychlorotrifluoroethylene, polyethylene, polypropylene, polynorbornene, polyether ether ketone, polyphenylene sulfide, polyarylate, polycarbonate, polystyrene, epoxy resins, and oxazine resins.

Among these elastomers, preferred are natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, and modified products thereof and, from the standpoint of obtaining excellent heat resistance, excellent cold resistance and the like, silicone rubber, acrylic rubber, and modified products thereof are more preferred.

The base portions 21 may each be provided as a two-color or multi-color molded article formed of two or more resin materials. In this case, by adopting the same material as that of the sheet section 10 for the base portions 21 on the side in contact with the sheet section 10, it is made easy to integrally mold the sheet section 10 and the base portions 21.

When the resonant parts 11 (base portions 21) having a circular cross-sectional shape are arranged, in a cross-section parallel to the sheet surface of the sheet section 10 at a height position of the resonant parts 11 (base portions 21) where a total cross-sectional area of the plural resonant parts 11 (base portions 21) is maximum, the diameter of a circle having the largest diameter among those circles (circular cross-sections) included in the cross-section is preferably 100 mm or less, more preferably 50 mm or less, still more preferably 20 mm or less. Further, the diameter of a circle having the smallest diameter is preferably 10 µm or more, more preferably 100 µm or more, and still more preferably 1 mm or more. By controlling the diameter to be in the above-described preferred numerical range, it is ensured that a prescribed number or more of the resonant parts 11 (base portions 21) can be arranged on the sheet surface of the sheet section 10, so that superior sound insulating performance can be obtained, and the ease of molding and the productivity tend to be further improved.

(Weight Portions)

Figure 4:
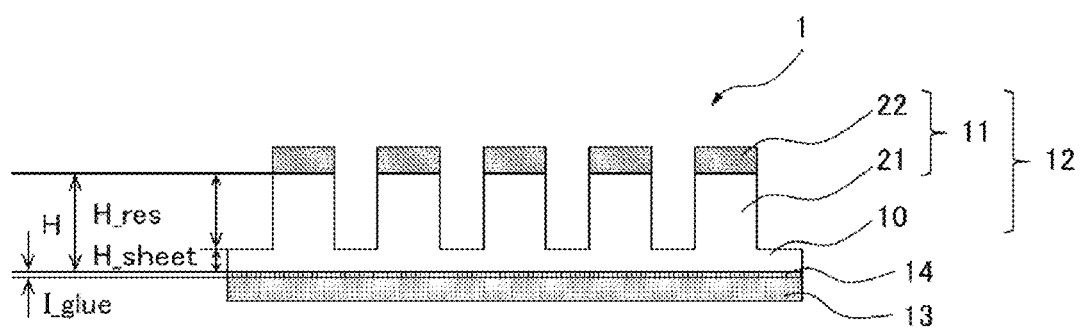
FIG. 4 is a cross-sectional view taken along a line III-III of FIG. 3.
Figure 9:
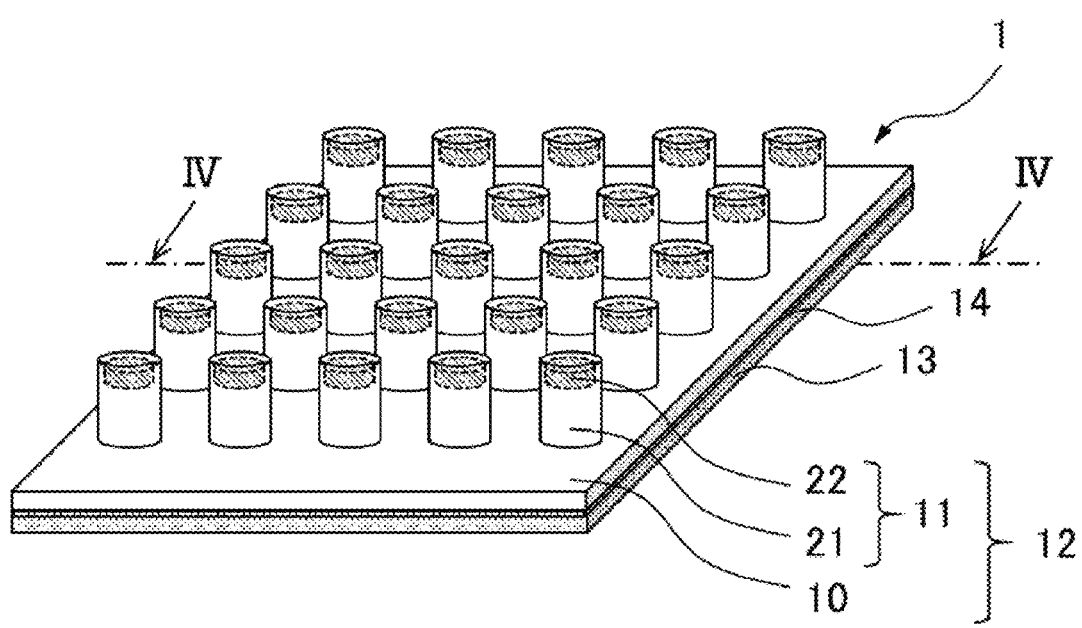
FIG. 9 is a schematic perspective view illustrating yet another sound insulating structure according to the present embodiment.
Figure 10:
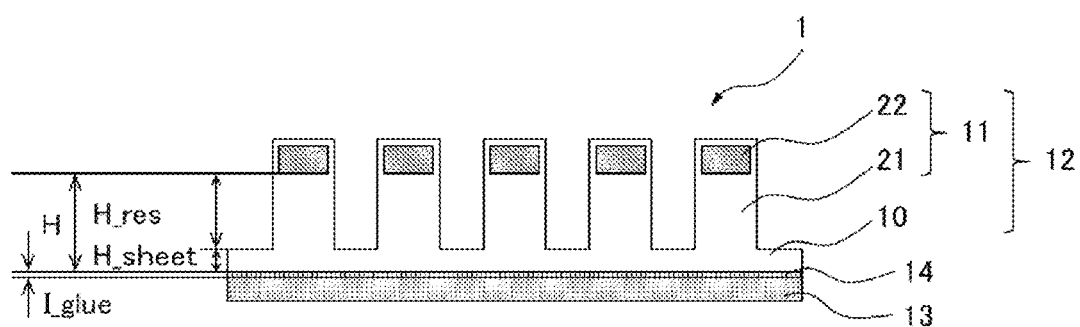
FIG. 10 is a cross-sectional view taken along a line IV-IV of FIG. 9.

The weight portions 22 (hereinafter, also referred to as "weights") are not particularly limited as long as they are provided on the respective base portions 21 and have a larger mass than the base portions 21. As illustrated in FIG. 3, the weight portions 22 may be arranged on top of the respective base portions 21, or may be arranged such that they are partially embedded in the respective base portions 21. From the standpoint of preventing the weight portions 22 from falling off during the production, it is preferred that the weight portions 22 be arranged such that they are at least partially embedded in the respective base portions 21, and it is particularly preferred that, as illustrated in FIG. 9, the weight portions 22 be arranged such that they are entirely embedded in the respective base portions 21. FIGS. 4 and 10 are a cross-sectional view taken along a line III-III of FIG. 3 and a cross-sectional view taken along a line IV-IV of FIG. 9, respectively. Further, from the standpoint of height reduction, weight reduction, or improvement in the sound insulating performance of the sound insulating member 12, the base portions 21 and the weight portions 22 are preferably arranged such that the center of gravity (center of mass) of each resonant part 11 is positioned on the tip side than at least the center of the resonant part 11 in the height direction.

Moreover, from the standpoint of preventing the weight portions 22 from falling off during the production of the sound insulating member, it is preferred that a single weight portion 22 (weight portion 22 constituted by a single member) be provided for each base portion.

A material constituting the weight portions 22 may be selected as appropriate taking into consideration the mass, the cost and the like, and the type of the material is not particularly limited. From the standpoints of downsizing, improvement in the sound insulating performance, and the like of the sound insulating member 12, the material constituting the weight portions 22 is preferably a material having a high specific gravity.

Specific examples of such a material include, but not particularly limited to: metals, such as aluminum, stainless steel, iron, tungsten, gold, silver, copper, lead, zinc and brass, and alloys thereof; inorganic glasses, such as soda glass, quartz glass, and lead glass; and composites that contain, for example, powder of any of the above-exemplified metals or alloys, or any of the above-exemplified inorganic glasses in the resin material of the above-described base portions 21. The material, mass, and specific gravity of the weight portions 22 may be determined such that the acoustic band gap of the sound insulating member 12 matches a desired sound insulating frequency range.

Among the above-described materials, at least one selected from the group consisting of metals, alloys, and inorganic glasses is preferred from the standpoints of low cost, high specific gravity and the like. It is noted that the specific gravity means a ratio between the mass of a material and the mass of an equal volume of pure water at 4° C. under a pressure of 1,013.25 hPa and, in the present specification, a value measured by JIS K0061 "Test methods for density and relative density of chemical products" is used.

From the standpoint of improving the sound insulating performance, the weight portions have a storage modulus of usually not less than 1,000 MPa, preferably not less than 2,000 MPa, more preferably not less than 5,000 MPa, still more preferably not less than 10,000 MPa, but usually 1,000,000 MPa or less, preferably 800,000 MPa or less, more preferably 600,000 MPa or less, still more preferably 500,000 MPa or less. The storage modulus of the weight portions can be measured by the same method as the above-described method of measuring the storage modulus of the sheet section and the projections.

A volume ratio of the weight portions in the resonant parts 11 is not particularly limited; however, from the standpoint of improving the sound insulating performance, it is usually 1% by volume or higher, preferably 5% by volume or higher, more preferably 10% by volume or higher, still more preferably 20% by volume or higher, but usually 90% by volume or lower, preferably 80% by volume or lower, more preferably 70% by volume or lower, still more preferably 50% by volume or lower, with respect to 100% by volume of the resonant parts.

Figure 11A:
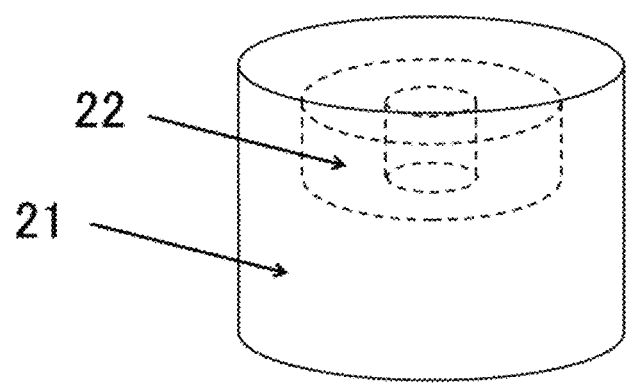
FIG. 11A is a schematic perspective view illustrating a resonant part that includes a base portion and a weight portion having a through-hole.
Figure 11B:
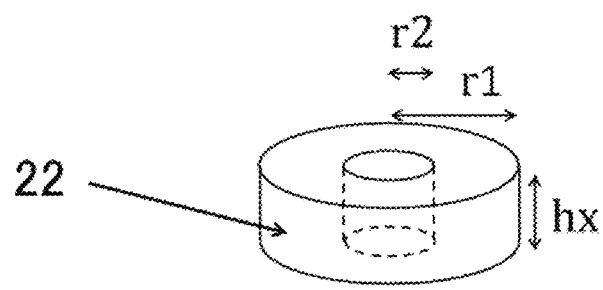
FIG. 11B is a schematic perspective view illustrating the weight portion having a through-hole.

The weight portions 22 may have a through-hole. A weight portion 22 having a through-hole will now be described referring to the drawings. FIG. 11A illustrates a resonant part that includes the base portion 21 and the weight portion 22, and FIG. 11B illustrates the weight portion 22. In the present invention, a weight having a through-hole refers to, for example, a weight that has a through-hole as illustrated in FIG. 11B, and examples of the shape thereof include a doughnut shape, a washer shape, and a nut shape.

The shape of the weight portion 22 is not particularly limited; however, it is preferably a plate shape from the standpoints of adjustment of sound insulating performance and thickness reduction. When the weight portion 22 has a plate shape, the center of gravity of the weight portion 22 can be positioned away from the sheet section 10 as compared to a case where the weight portion 22 has a spherical shape or the like, so that it is tended that the vibration moment of the resonant parts 11 can be increased. For example, when the acoustic band gap width is set constant, the weight portion 22 having a plate shape can be thinner than the weight portion 22 having a spherical shape or the like. On the other hand, when the height of the weight portion 22 is set constant, the weight portion 22 having a plate shape can give a wider band gap width than the weight portion 22 having a spherical shape or the like.

In FIG. 11A, the weight portion 22 is formed in a substantially circular shape having an outer diameter smaller than that of the base portion 21, and the weight portion 22 is embedded in the base portion 21 on the tip side of the resonant part 11. Since, in this manner, a configuration in which the weight portion 22 acting as a weight of a resonator is supported on the base portion 21 that determines the spring constant is employed, the resonance frequency of the resonant part 11 can be easily controlled by, for example, adjusting the spring constant through modification of the shape or material (storage modulus or mass) of the base portion 21, or changing the mass of the weight portion 22. Generally, a reduction in the storage modulus of the base portion 21 tends to result in a shift of the acoustic band gap toward the low frequency side. Further, an increase in the mass of the weight portion 22 tends to result in a shift of the acoustic band gap toward the low frequency side.

In FIG. 11B, hx represents the height of the weight, $r_1$ represents the outer diameter of the weight, and $r_2$ represents the diameter (inner diameter) of the through-hole.

The height (hx) of the weight portion 22 is not particularly limited; however, when the height of the resonant part 11 is 1, the height (hx) is preferably 0.95 or less, more preferably 0.9 or less, but preferably not less than 0.2, more preferably not less than 0.3. When the height (hx) is in this range, a wide sound insulating band width tends to be obtained while the height of the sound insulating sheet member is reduced.

The outer diameter ($r_1$) of the weight portion 22 is not particularly limited. In cases where the base portion 21 has a circular cross-sectional shape, excellent sound insulating performance tends to be obtained when the outer diameter ($r_1$) is approximately the diameter of the circular cross-sectional shape. A maximum value of $r_1$ is not particularly limited; however, it is preferably 100 mm or less, more preferably 50 mm or less, still more preferably 20 mm or less. Further, a minimum value of $r_1$ is preferably 10 µm or larger, more preferably 100 µm or larger, and still more preferably 1 mm or larger. By controlling $r_1$ to be in the above-described preferred numerical range, good sound insulating performance can be obtained, and the ease of molding and the productivity tend to be further improved as well.

The weight portion 22 may be embedded in the base portion 21, or may be exposed. In the weight portion 22 having a through-hole, even this through-hole is filled with a resin material or the like, and this portion also acts as a fixation end on the base portion 21; therefore, even if the weight portion 22 is exposed, detachment or breakage of the weight portion 22 can be inhibited.

The inner diameter ($r_2$) of the weight portion 22 is not particularly limited. A maximum value of $r_2$ is not particularly limited as long as it is smaller than the outer diameter ($r_1$); however, it is preferably 90 mm or less, more preferably 40 mm or less, still more preferably 20 mm or less, particularly preferably 10 mm or less. Further, a minimum value of $r_2$ is preferably 2 µm or larger, more preferably 50 µm or larger, and still more preferably 80 µm or larger. By controlling $r_2$ to be in the above-described preferred numerical range, it tends to be made easy to fill a resin material or the like into the through-hole.

Moreover, a ratio between the outer diameter and the inner diameter of the weight portion 22 is not particularly limited.

On the surface (including the through-hole) of the weight portion 22, a surface treatment may be performed for the purpose of improving the process suitability and the member strength.

For example, it is conceivable to perform a chemical treatment with a solvent or the like for enhancing the adhesion with the base portion 21 or to perform a physical treatment that forms irregularities on the surface and thereby improves the member strength; however, a method of the surface treatment is not particularly limited.

[Protruding Parts]

The sound insulating member 12 may further include a protruding part other than the above-described resonant parts 11 on one side (surface on the side provided with projections) of the sheet section. For example, the sound insulating member 12 may have rib-like protruding parts 31 as illustrated in FIG. 12, or columnar protruding parts such as cylindrical protruding parts 32 as illustrated in FIG. 13. It is noted here that, as described above, these protruding parts are included in the concept of projections. In order to clearly present this, the protruding parts are indicated as "31(11)" and "32(11)" in FIGS. 12 and 13, respectively.

A shape and arrangement positions of the protruding parts are not particularly limited as long as they are arranged in a manner not to interfere with the resonant parts 11 acting as resonators. For example, an outer shape of the protruding parts is not particularly limited, and the protruding parts can take any shape, examples of which include: polygonal prism shapes, such as a triangular prism shape, a rectangular prism shape, a trapezoidal prism shape, a pentagonal prism shape, and a hexagonal prism shape; cylindrical shapes; elliptic cylinder shapes; truncated pyramid shapes; truncated cone shapes; pyramid shapes; cone shapes; hollow tubular shapes; and irregular shapes that are not classified into the above-described shapes. The protruding parts can also be formed in a columnar shape that has a varying cross-sectional area and/or cross-sectional shape depending on the height position. Further, a maximum length of the protruding parts in the length direction of the sheet section 10 is not particularly limited as long as it is not greater than the maximum length of the sheet in the MD direction.

A shape of the protruding parts is not particularly limited and, when the protruding parts are allowed to function as a spacer, the protruding parts may be higher than the maximum height H_res of the resonant parts 11. Further, when the protruding parts are allowed to function as a vibrator, the positions, number, and height of the protruding parts to be arranged can be adjusted in accordance with the frequency range to be adjusted.

A maximum height H_rib of the protruding parts is not particularly limited as long as it is greater than the maximum height H_res of the resonant parts 11. From the standpoints of the ease of molding, improvement of the productivity and the like, the maximum height H_rib of the protruding parts is preferably 50 µm or greater, more preferably 100 µm or greater, still more preferably 1 mm or greater, but preferably 20 mm or less, more preferably 15 mm or less, still more preferably 10 mm or less, yet still more preferably 5 mm or less, particularly preferably 3 mm or less.

The rib-like protruding parts 31 will now be described and, within an applicable range, protruding parts of other shape, such as the cylindrical protruding parts 32, can also be designed in the same manner.

The rib-like protruding parts 31 are each molded to have a substantially plate-like outer shape in such a manner to extend in the length direction (sheet flow direction or MD direction) of the sheet section 10. The rib-like protruding parts 31 are arranged on the sheet surface of the sheet section 10, more specifically at two positions in the respective marginal parts of the sheet section 10 in the width direction (direction perpendicular to the sheet flow direction, or TD direction).

The rib-like protruding parts 31 have a maximum height H_rib that is higher than the maximum height H_res of the above-described resonant parts 11 in the normal direction of the sheet section 10. This allows the rib-like protruding parts 31 to function as a spacer even if the sound insulating member 12 is wound in the form of a sheet or a plurality thereof are disposed on top of each other during the production of the sound insulating member 12, and the resonant parts 11 are thus prevented from coming into contact with the backside of the sheet section 10. Therefore, by arranging the rib-like protruding parts 31, it is made easy to produce and store the sound insulating member 12 in a so-called roll-to-roll manner, without causing manufacturing problems such as deformation, modification, cracking, detachment, and breakage of the resonant parts 11. Further, the rib-like protruding parts 31 can each function as a vibrator (resonator) that vibrates at a certain frequency when a sound wave is input from a noise source.

It is noted here that, although a pair of the rib-like protruding parts 31 extending in the length direction of the sheet section 10 is adopted in FIG. 12, a plurality of the rib-like protruding parts 31 having a shorter maximum length may be arranged apart from each other along the length direction of the sheet section 10. In this case, the arrangement interval between the individual rib-like protruding parts 31 may be periodic or random. When a plurality of the rib-like protruding parts 31 are arranged apart from each other in this manner, the distance between the individual rib-like protruding parts 31 is not particularly limited; however, it is preferably 100 mm or less, more preferably 50 mm or less, still more preferably 20 mm or less.

A material constituting the rib-like protruding parts 31 is not particularly limited; however, it is preferably the same resin material as that of the sheet section 10 and/or the resonant parts 11 (base portions 21), more preferably the same elastomer as that of the sheet section 10 and/or the resonant parts 11 (base portions 21). By using the same resin material as that of the sheet section 10 and/or the base portions 21, it is made easy to integrally mold the sheet section 10 and/or the resonant parts 11 (base portions 21), so that the productivity is dramatically improved.

The protruding parts 31 are protrusions in the same manner as the resonant parts and thus act in the same manner as the resonant parts. In this case, for the calculation of E_membrane in the above-described Formula (1), conversions are performed by, for example, substituting E_res with the storage modulus E_rib of the protruding parts 31 and H_res with H_rib, and the combined storage modulus (E'_membrane) is determined for each of the protruding parts 31 using the above-described Formulae (S4) to (S6), after which a weighted average value of the storage modulus, which is weighted by the number of protrusions, is calculated for all of the protrusions on the sheet surface together with the plural resonant parts 11, and the thus obtained average value is defined as E_membrane.

Further, for the calculation of the height H of the sheet section and the projections, H_membrane is calculated assuming each protruding part as an aggregate of plural projections; however, when such rib-like protruding parts as illustrated in FIG. 12 are used, the area of bottom surface (surface of the projections in contact with the sheet section) is different between the resonant parts and the rib-like protruding parts. Therefore, first, H_res is substituted with H_rib to determine the combined height (H') for each of the protruding parts 31 using the above-described Formula (B), and a weighted average value of the combined height, which is weighted by the bottom area of the protrusions, is calculated for all of the protrusions existing on the sheet surface together with the plural resonant parts 11, and the thus obtained weighted average value is defined as H_membrane. This height calculation method, which is employed when there are two parts having different bottom surface areas, can also be applied in the same manner when plural kinds of resonant parts are used.

Similarly also in a case where cylindrical protruding parts having the same bottom surface area as the resonant parts are used as illustrated in FIG. 13, H_res is substituted with H_rib to determine the combined height (H') for each of the protruding parts 31 using the above-described Formula (B), and a weighted average value of the combined height, which is weighted by the bottom area of the protrusions, is calculated for the protruding parts 31 together with the plural resonant parts 11, and the thus obtained weighted average value is defined as H_membrane.

[Adhesive Layer]

The adhesive layer is not particularly limited as long as it is arranged on a surface of the sheet section on the opposite side of the side provided with the projections. Particularly, the adhesive layer preferably adheres the above-described sound insulating member to the below-described adherend (e.g., a product or component to be sound-insulated). A method of adhering the sound insulating member to an adherend via the adhesive layer is not particularly limited, and examples thereof include a method of press-bonding separately molded components by hot-pressing or pressing, a method of adhering components using a variety of known additives, and a method of joining components by heat welding, ultrasonic welding, laser welding or the like. However, in a method where the sheet is hot-pressed or pressed and thereby press-bonded for adhesion, since the sound insulating member has irregularities on its surface, it is difficult to obtain a uniform and adequate adhesive strength on the adhesion surface. Further, in a method employing heat welding or ultrasonic welding, it is highly likely that the sheet is melted and deformed and this deformation during adhesion causes the sound insulating/vibration-damping frequency to deviate from an originally designed one. Therefore, it is particularly effective to adhere and arrange the sound insulating member using an adhesive.

It is noted here that the sound insulating structure according to the present embodiment encompasses not only a configuration in which the adhesive layer is arranged in the entire space between an adherend and the sheet section, but also a configuration that includes some parts where the adhesive layer is not arranged between an adherend and the sheet section.

In order to allow sufficient sound insulating performance to be exerted, it is preferred to reduce the thickness of the adhesive layer and to control the ratio of the storage modulus of the adhesive layer with respect to the storage modulus of the sheet section and the projections to be in certain ranges as shown in the following Formulae (2) and (3):

$$7{,}000 \geq E\_\text{glue}/E\_\text{membrane} \geq 0.5 \tag{2}$$

$$50.0 \geq E\_\text{glue}/E\_\text{adh} \geq 0.00002 \tag{3}$$

E_glue (MPa): storage modulus of adhesive layer
E_membrane (MPa): storage modulus of sheet
E_adh (MPa): storage modulus of adherend The above Formula (2) indicates that the storage modulus of the sheet section constituting a layer adjacent to the adhesive layer and the storage modulus of the adhesive layer are within a certain ratio and, when this value is in the above-described range, reflection of an elastic wave at the interface between the sheet section and the adhesive layer hardly occurs and vibration energy is thus likely to be transferred to the resonant parts, so that the sound insulating performance tends to be improved. Particularly, when E_glue/E_membrane=1, there is no energy loss since reflection of an elastic wave at the interface does not occur at all. This is also preferred from the standpoint of product durability since the possibility of detachment of the adhesive layer at the interface, which is caused by differences in the amount of elongation and that of strain during vibration due to a difference in the storage modulus, is reduced.

Further, similarly, the above Formula (3) indicates that the storage modulus of an adherend constituting a layer adjacent to the adhesive layer and the storage modulus of the adhesive layer are within a certain ratio and, when this value is in the above-described range, reflection of an elastic wave at the interface between the adherend and the adhesive layer hardly occurs and vibration energy is thus likely to be transferred to the resonant parts, so that the sound insulating performance tends to be improved. Particularly, when E_glue/E_adh=1, there is no energy loss since reflection of an elastic wave at the interface does not occur at all. This is also preferred from the standpoint of product durability since the possibility of detachment of the adhesive layer at the interface, which is caused by differences in the amount of elongation and that of strain during vibration due to a difference in the storage modulus, is reduced.

An average thickness I_glue of the adhesive layer is not particularly limited; however, from the standpoints of vibration energy transfer and material cost, the thinner the adhesive layer, the more preferred it is, and the average thickness I_glue preferably satisfies the following Formula (4):

$$1.0 \geq I\_\text{glue} \geq 0.005 \tag{4}$$

Further, I_glue is more preferably not less than 0.01 mm, still more preferably not less than 0.02 mm, particularly preferably not less than 0.05 mm, but preferably 0.8 mm or less, more preferably 0.5 mm or less, still more preferably 0.3 mm or less, particularly preferably 0.25 mm or less.

The storage modulus of the adhesive layer is not particularly limited; however, it is usually not less than 0.1 MPa, preferably not less than 1 MPa, more preferably not less than 10 MPa, still more preferably not less than 50 MPa, but usually 10,000 MPa or less, preferably 5,000 MPa or less, more preferably 3,000 MPa or less, still more preferably 1,000 MPa or less. When the storage modulus is higher than the above-described range, the adhesive layer is easily cracked and/or peeled off due to an increased brittleness, while when the storage modulus is lower than the above-described range, the adhesive strength and the peeling strength are reduced. Therefore, the storage modulus is preferably in a range of more than 10 MPa but 10,000 MPa or less. The storage modulus of the adhesive layer can be measured by the same method as the above-described method of measuring the storage modulus of the sheet section and the projections.

The sound insulating structure according to another embodiment of the present invention is a mode in which the requirement of Formula (1) in the above-described sound insulating structure is changed to the above-described requirement for the storage modulus of the adhesive layer, particularly the requirement that the storage modulus of the adhesive layer is more than 10 MPa. Specifically, the sound insulating structure according to another embodiment of the present invention is a sound insulating structure including: a sound insulating member that includes a sheet-like sheet section and plural projections arranged on the sheet section; and an adhesive layer, and this adhesive layer has an elastic modulus of more than 10 MPa.

It is noted here, however, that this sound insulating structure preferably satisfies the requirement of Formula (1) and, with regard to the conditions other than that of Formula (1), the same conditions as those of the above-described sound insulating structure can be applied.

With regard to control of the mechanical properties of an adhesive such as storage modulus, since an adhesive is also a type of polymer, it is regarded as the same as control of the mechanical properties of a polymer material. In other words, the mechanical properties of a polymer material containing an adhesive are dependent on the chemical structure of a polymer chain as well as the molecular weight and molecular weight distribution of a polymer chain, the cross-linked structures and cross-linking density between polymer chains, and an added filler. Particularly, the storage modulus of a resin can be controlled by adjusting the polymer crystallinity. Examples of a commonly used method of increasing the degree of crystallization include a method of improving the molecular rigidity by introducing a conjugated structure to a main structure, a method of reducing branches of a polymer chain by controlling a polymerization reaction through adjustment of the reaction conditions, the use of a catalyst and the like, a method of enhancing intermolecular interactions by introducing a hetero atom and a hydrogen bond moiety to a polymer chain, and a method of lowering the rate of precipitation out of a polymer solution. Besides adjustment of the degree of crystallization, introduction of an additive is also effective for adjustment of the storage modulus of a resin. For example, the storage modulus can be reduced by introducing a plasticizer and thereby weakening intermolecular interactions, while the storage modulus can be increased by integrating glass fibers, carbon fibers, a layered clay mineral, a metal oxide, a metal or the like having a high storage modulus. With regard to the storage modulus of a cross-linked polymer such as an elastomer, it can be controlled by adjusting the crosslinking density, the amount of a crosslinking agent, and/or the reaction rate. Generally speaking, when the crosslinking density is lowered, molecular chains between crosslinking sites are extended and are thus more likely to elongate, so that the storage modulus can be reduced, whereas when the crosslinking density is increased, molecular chains between crosslinking sites are shortened and are thus less likely to elongate, so that the storage modulus can be increased. Further, it is also possible to control the storage modulus by integrating fine particles made of a material having a high storage modulus, such as carbon black, silica or carbon nanotubes, as a filler, and adjusting the size, amount, dispersibility and the like of this filler.

The loss elastic modulus and the residual strain after load of a resin portion are not particularly limited; however, for the utilization of resonance of the resonant parts, the loss elastic modulus and the residual strain are preferably small. In other words, in the measurement method of the present invention, the maximum indentation depth $h_{max}$ and the amount of displacement during unloading $h_f$ of the sound insulating member constituted by the sheet section and the resonant parts, which are measured using an indentation microhardness tester, preferably satisfy $0.5 \geq h_f/h_{max} \geq 0.0$.

A material of the adhesive layer is not particularly limited as long as it is selected in a range that satisfies the above-described Formula (1); however, it is preferably selected in a range that satisfies both the above-described Formulae (2) and (3). Examples of such a material include silicone resins, epoxy resins, cyanoacrylate resins, vinyl acetate resins, polyvinyl acetal resins, ethylene-vinyl acetate resins, vinyl chloride resins, acrylic resins, polyamide resins, cellulose resins, olefin resins, polyvinyl butyral resins, urea resins, melamine resins, phenolic resins, resorcinol resins, epoxy resins, polyester resins, polyurethane resins, polyaromatic resins, chloroprene rubber, nitrile rubber, styrene-butadiene rubber, polysulfide rubber, butyl rubber, silicone rubber, acrylic rubber, modified silicone rubber, urethane rubber, silylated urethane resin, telechelic polyacrylate-based adhesives, and mixtures of these materials. Thereamong, from the standpoint of satisfying all of adhesiveness, peeling durability, impact resistance, heat resistance, and chemical resistance, the material of the adhesive layer is preferably one or more resins selected from the group consisting of silicone resins, epoxy resins, cyanoacrylate resins, acrylic resins, and urethane resins, particularly preferably one or more resins selected from the group consisting of silicone resins, epoxy resins, and cyanoacrylate resins.

A total content ratio of the above-described materials in the adhesive layer is not particularly limited; however, from the standpoints of appropriate viscosity for coating and appropriate curing rate, it is usually not less than 10% by weight, preferably not less than 20% by weight, more preferably not less than 25% by weight, still more preferably not less than 30% by weight. There is no particular preferred upper limit; however, it is usually 90% by weight or less.

Specific examples of an adhesive that can be used in the adhesive layer include, but not particularly limited to: acrylic resin-based adhesives, such as OP-1030M manufactured by Denka Company Limited, OP-1505 manufactured by Denka Company Limited, OP-3010P manufactured by Denka Company Limited, the known composition disclosed in WO2011/046120, and the known composition disclosed in Japanese Unexamined Patent Application Publication No. 2013-112766; epoxy resin-based adhesives, such as AY-5302 manufactured by ALTECO Co., Ltd., AY-5231 manufactured by ALTECO Co., Ltd., AY-5274 manufactured by ALTECO Co., Ltd., AY-5011 manufactured by ALTECO Co., Ltd., AY-5012 manufactured by ALTECO Co., Ltd., AY-5158 manufactured by ALTECO Co., Ltd., AY-5158 manufactured by ALTECO Co., Ltd., AY-5218C manufactured by ALTECO Co., Ltd., AY-5218D manufactured by ALTECO Co., Ltd., AY-5259 manufactured by ALTECO Co., Ltd., AY-5321 manufactured by ALTECO Co., Ltd., and the known composition disclosed in Japanese Unexamined Patent Application Publication No. 2006-169446; silicone resin-based adhesives, such as KER-6020-F manufactured by Shin-Etsu Chemical Co., Ltd., KER-6020-F1 manufactured by Shin-Etsu Chemical Co., Ltd., and KER-6020-F2 manufactured by Shin-Etsu Chemical Co., Ltd.; polyolefin resin-based adhesives, such as MX02D manufactured by Tosoh Corporation, MX06 manufactured by Tosoh Corporation, MX07 manufactured by Tosoh Corporation, MX11 manufactured by Tosoh Corporation, MX15 manufactured by Tosoh Corporation, MX23 manufactured by Tosoh Corporation, MX28 manufactured by Tosoh Corporation, MX37 manufactured by Tosoh Corporation, MX53C manufactured by Tosoh Corporation, MZ14A manufactured by Tosoh Corporation, and JS01 manufactured by Tosoh Corporation. These adhesives may be used singly, or in combination of two or more thereof, as long as incorporation thereof does not cause a disadvantage such as inhibition of curing.

The adhesive layer may also contain an inorganic filler and fibers, and examples thereof include silica particles, alumina particles, metal oxides such as titanium oxide, carbon particles, carbon blacks, graphite, and fibrillized products thereof.

The content of the above-described inorganic materials (particularly the inorganic filler) in the adhesive layer is not particularly limited; however, from the standpoint of hardness adjustment and viscosity of a coating solution, it is usually not less than 1% by weight, preferably not less than 10% by weight, more preferably not less than 20% by weight, still more preferably not less than 25% by weight, but usually 80% by weight or less, preferably 70% by weight or less, more preferably 50% by weight or less, still more preferably 40% by weight or less.

[Adherend]

The adherend 13 is not particularly limited in terms of its shape, material and the like as long as the above-described sound insulating member can be adhered thereto via the above-described adhesive layer 14.

The term "adherend" used herein refers to a material which maintains a sheet section (sound insulating member) with an adhesive layer therebetween, more specifically a product, a component or the like to be sound-insulated.

A storage modulus $E\_adh$ of the adherend is not particularly limited, and the adherend often has a high storage modulus since it is likely to generate a sound by vibration. The storage modulus $E\_adh$ of the adherend is usually not less than 500 MPa, preferably not less than 1,000 MPa, more preferably not less than 2,000 MPa and, although there is no preferred range for an upper limit, the storage modulus $E\_adh$ of the adherend is usually 300,000 MPa or less.

The storage modulus $E\_adh$ of the adherend can be measured by the same method as the above-described method of measuring the storage modulus of the adhesive layer.

In the present specification, the storage modulus $E\_adh$ of the adherend means a storage modulus of a member of a portion that is in contact with the adhesive layer and, when a portion of the adherend that is in contact with the adhesive layer is constituted by two or more members, these plural members are handled individually to evaluate whether or not each member satisfies the requirements of the present embodiment. In other words, for one of the plural members, the conditions of Formula (1) and the like described above in relation to the sound insulating member and the adhesive layer that exist immediately above the member are applied.

With regard to the storage modulus $E\_adh$ of the adherend, when the adherend is divided into two or more members in a portion that is not in contact with the adhesive layer, the storage moduli of these members in the portion that is not in contact with the adhesive layer do not have to be considered.

A thickness of the adherend is not particularly limited; however, from the standpoint of allowing sound insulating performance to be more effectively exerted, the thickness of the adherend is usually not less than 0.5 mm, preferably not less than 1 mm, more preferably not less than 2 mm, still more preferably not less than 3 mm and, although there is no preferred range for an upper limit, the thickness of the adherend is usually 300 mm or less. In this case, for example, when the adherend is in the form of a plate, the thickness of the adherend refers to a thickness of the plate; when the adherend is in the form of a dense cube and the above-described sound insulating member is disposed on an upper surface of this cube via the adhesive layer, the thickness of the adherend refers to a height of the cube; and when the adherend is in the form of a hollow cube consisting of six plates and the above-described sound insulating member is disposed on an upper surface of this cube via the adhesive layer, the thickness of the adherend refers to a thickness of the plate constituting the upper surface of the cube.

A material of the adherend is not particularly limited, and examples thereof include engineering plastics, metal plates, and alloy plates. Examples of the engineering plastics include polyacetal (POM), polyamide (PA), polycarbonate (PC), modified polyphenylene ether (m-PPE), polybutylene terephthalate (PBT), ultrahigh-molecular-weight polyethylene (UHPE), syndiotactic polystyrene (SPS), amorphous polyarylate (PAR), polysulfone (PSF), polyether sulfone (PES), polyphenylene sulfide (PPS), polyether ketone (PEEK), polyimide (PI), polyether imide (PEI), fluororesins (fluorocarbon polymers), and liquid crystal polymers (LCP). These engineering plastics may contain a resin reinforcing material that enhances the hardness as in, for example, glass fiber (GF)-reinforced polyethylene terephthalate (GF-PET) and GF-reinforced polyamide (GF-PA). Examples of an adherend metal include general metals, such as aluminum, iron and stainless steel, and alloys. Further, the adherend may be one on which any of the above-described resins and metals is disposed.

[Natural Frequency of Sound Insulating Structure]

In the sound insulating structure, the amount of normalized natural frequency shift represented by the following formula is not particularly limited; however, the smaller a shift in the frequency band where a sound insulating effect is generated, the more preferred it is; therefore, the amount of normalized natural frequency shift is preferably 30% or less, more preferably 25% or less, still more preferably 20% or less, particularly preferably 15% or less, especially preferably 10% or less, most preferably 5% or less. Further, although there is no particular preferred lower limit, the amount of normalized natural frequency shift is usually 0% or more, and may be 0.05% or more, or 0.1% or more.

Amount of normalized natural frequency shift (%)=
((Design natural frequency)−(Natural frequency))÷(Design natural frequency)

Design natural frequency (Hz): natural frequency determined in a condition without adhesive layer Natural frequency (Hz): natural frequency determined in a condition with adhesive layer The sound insulating structure according to another embodiment of the present invention is a mode in which the requirement of Formula (1) in the above-described sound insulating structure is changed to the above-described requirement for the natural frequency. Specifically, the sound insulating structure according to another embodiment of the present invention is a sound insulating structure including: a sound insulating member that includes a sheet-like sheet section and plural projections arranged on the sheet section; and an adhesive layer arranged on a surface of the sheet section on the opposite side of the side provided with the projections, wherein the amount of normalized natural frequency shift satisfying the following formula is 0 to 30%:

Amount of normalized natural frequency shift (%)=
((Design natural frequency)−(Natural frequency))÷(Design natural frequency)

Design natural frequency (Hz): natural frequency determined in a condition without adhesive layer Natural frequency (Hz): natural frequency determined in a condition with adhesive layer It is noted here, however, that this sound insulating structure preferably satisfies the requirement of Formula (1) and, with regard to the conditions other than that of Formula (1), the same conditions as those of the above-described sound insulating structure can be applied.

[Method of Producing Sound Insulating Structure]

A method of producing the sound insulating structure is not particularly limited and may be, for example, a method that includes: the step of forming a sound insulating member having plural projections on one side of a sheet section; and the step of arranging an adhesive layer on the sound insulating member (on a surface of the sheet section on the opposite side of the side provided with the projections). When the sound insulating structure includes an adherend to which the sound insulating member is adhered via the adhesive layer, the method may further include the step of arranging the adherend to which the sound insulating member is adhered via the adhesive layer.

In the step of forming a sound insulating member having plural projections, a method of forming the plural projections is not particularly limited and, for example, a method in which a mold having plural cavities is prepared and a resin, a rubber or a precursor thereof is subsequently poured into the cavities and cured may be employed. Examples of a curing method include: for a case of using a thermoplastic raw material, a method of pouring the raw material that has been melted by heating into the cavities and subsequently curing the raw material by cooling; and, for a case of using a thermosetting or photocurable raw material, a method of pouring the raw material into the cavities and subsequently curing the raw material by heating or with light. In these cases, the conditions of heating, light and the like can be designed as appropriate in accordance with the raw material.

In the step of arranging an adhesive layer on the sound insulating member, a method of arranging the adhesive layer is not particularly limited, and examples thereof include a method of applying materials of the adhesive layer to the sound insulating member produced in the above-described step of forming a sound insulating member having plural projections. With regard to the conditions and the like of this application, those of a known method can be applied.

In the step of arranging an adherend to which the sound insulating member is adhered via the adhesive layer, a method of adhering the adherend is not particularly limited, and examples thereof include a method of melting an adhesive by heating or the like, bringing the adherend into contact with the thus melted adhesive, and subsequently curing the adhesive by cooling.

Examples of a concrete production method of a sound insulating structure having an adherend include the below-described production methods 1 to 4. It is noted here that a shape of the cavities used in each production method is not particularly limited, and the bottom shape of the cavities can be selected as appropriate from, for example, a hemispherical shape, a planar shape, a convex shape, and a concave shape. With regard to the production methods 3 and 4, reference can be made to the production methods described in WO2010/3080794 and the like.

(Production Method 1)

The production method 1 may include the following steps (1) to (3):
(1) the step of preparing a mold having plural cavities, and pouring a resin material into the cavities;
(2) the step of curing the poured resin material; and
(3) the step of detaching the thus obtained cured product from the mold.

In the production method 1, the step of applying an adhesive to the thus obtained cured product (or an adherend) and adhering the cured product to the adherend is incorporated after the step (2) or (3).

(Production Method 2)

The production method 2 may include the following steps (4) to (7):
(4) the step of preparing a mold having plural cavities, and arranging a weight in each of the plural cavities provided in the mold;
(5) the step of pouring a resin material into the cavities;
(6) the step of curing the poured resin material; and
(7) the step of detaching the thus obtained cured product from the mold.

In the production method 2, the step of applying an adhesive to the thus obtained cured product (or an adherend) and arranging the adherend on the cured product is incorporated after the step (6) or (7).

(Production Method 3)

The production method 3 may include the following steps (8) to (13):
(8) the step of applying a photocurable elastomer precursor or photocurable resin precursor to a mold having plural cavities;
(9) the step of disposing a support on the elastomer precursor or resin precursor flattened on the mold;
(10) the step of pressing the resulting layered product of the support and the mold from the support side using a press roll to fill the cavities with the elastomer precursor or resin precursor;
(11) the step of irradiating light from the support side to cure the elastomer precursor or resin precursor on which the shape of the cavities of the mold has been transferred and formed, and to polymerize and adhere the resulting cured product of the elastomer precursor or resin precursor to the support;
(12) the step of detaching the cured product of the elastomer precursor or resin precursor and the support, which have been thus adhered, from the mold; and
(13) the step of adhering the support to an adherend using an adhesive.

(Production Method 4)

The production method 4 may include the following steps (14) to (17):
(14) the step of, while rotating a roll mold having an outer peripheral surface on which plural cavities are arrayed and thereby allowing a support coated with an adhesive to travel in the rotating direction of the roll mold along the outer peripheral surface of the roll mold, a photocurable elastomer precursor or photocurable resin precursor is applied to the outer peripheral surface of the roll mold to fill the cavities with the elastomer precursor or resin precursor: in this step, an adhesive does not have to be used since curing of a photocurable resin allows the resin and the support to adhere with each other, and a mode in which an adhesive is not used is preferred from the standpoint of improving the productivity;
(15) the step of irradiating a region between the outer peripheral surface of the roll mold and the support with light in a state where the elastomer precursor or resin precursor is sandwiched between the outer peripheral surface of the roll mold and the support;

(16) the step of detaching the resulting cured product of the elastomer precursor or resin precursor and the support, which have been adhered in the step (15), from the roll mold; and

(17) the step of adhering the support to an adherend using an adhesive.

Examples of a method of arranging the resonant parts 11 and the protruding parts 31 on the sheet section 10 include not only a method of integrally molding these components using a mold as described above, but also a method of press-bonding separately molded components by hot-pressing or pressing, a method of adhering the components using a variety of known additives, and a method of joining the components by heat welding, ultrasonic welding, laser welding or the like. Examples of the adhesives include, but not particularly limited to: epoxy resin-based adhesives, acrylic resin-based adhesives, polyurethane resin-based adhesives, silicone resin-based adhesives, polyolefin resin-based adhesives, polyvinyl butyral resin-based adhesives, and mixtures of these adhesives. It is noted here that a part or the entirety of the resonant parts 11 and the protruding parts 31 can also be formed by punching out a rubber plate obtained by the above-described molding method. Further, when the resonant parts 11 are partially made of a metal or an alloy, the resonant parts 11 can be formed by, for example, cutting the metal or the alloy.

For example, a production method using a 3D printer or the like may be employed as well.

From the standpoint of, for example, improving the productivity and the economic efficiency, a method of integrally molding the sound insulating member 12 by die molding, cast molding or the like is preferred. One example thereof is a method of molding an integrally molded product of the sheet section 10 and resonant parts 11 by using a mold or a cast that is provided with cavities having a shape corresponding to the integrally molded product of the sheet section 10 and resonant parts 11. As such an integral molding method, there is a variety of known methods such as press molding, compression molding, cast molding, extrusion molding, and injection molding, and the type of the integral molding method is not particularly limited. It is noted here that, when a raw material of each component is, for example, a resin material having a viscoelasticity, the raw material can be poured into the cavities in the form of a liquid precursor or a hot melt. Further, when the raw material of each component is a metal, an alloy, or an inorganic glass, the raw material can be arranged (inserted) in advance at prescribed positions inside the cavities.

The resin material is not particularly limited, and examples thereof include those materials exemplified above for the sound insulating member and the like, as well as raw materials and intermediates thereof.

FIGS. 14 to 17 are drawings that illustrate one example of a production process of the sound insulating member 12. In this production process, using a mold 61 with cavities 61a having a shape corresponding to the above-described resonant parts 11 (see FIG. 14), the weight portions 22 are arranged in the cavities 61a of the mold 61 (see FIG. 15), and a resin material having a viscoelasticity is subsequently poured into the cavities 61a and then heated or pressed as required (see FIG. 16), after which the resulting integrally molded product of the sheet section 10 and the resonant parts 11 is removed from the mold, whereby the sound insulating member 12 is obtained. According to this integral molding method, not only the productivity and the economic efficiency can be improved, but also even a complex shape can be easily molded, and the sound insulating member 12 tends to be easily obtained with an improved adhesive strength between the components and thus excellent mechanical strength. From these standpoints as well, the sheet section 10 and the resonant parts 11 are preferably in the form of an integrally molded product that contains a thermosetting elastomer or a thermoplastic elastomer.

The above-described sound insulating structure has a configuration in which the plural resonant parts 11 are arranged in contact with the sheet surface of the sheet section 10. Thus, when a sound wave is input thereto from a noise source, high sound insulating performance exceeding the law of mass can be obtained. In addition, the resonance frequency of the resonant parts 11 can be easily controlled by, for example, adjusting the spring constant through modification of the shape, density distribution, or material (storage modulus or mass) of the resonant parts 11 and the base portion 21, or changing the mass of the weight portions 22. Moreover, the frequency band (acoustic band gap width and frequency position) can be controlled by modifying the material, thickness or the like of the sheet section 10. Therefore, the sound insulating structure 1 according to the present embodiment is excellent in terms of the degree of freedom in the selection of a sound insulating frequency as well as the degree of freedom in the design as compared to conventional sound insulating structures.

It is noted here that the above-described sound insulating structure can be used not only as a structure intended for sound insulating, but also as a structure intended for vibration damping.

[Simulation of Resonance Frequency]

In the below-described Examples, the resonance frequency of a structure was calculated using COMSOL Multiphysics (manufactured by COMSOL, Inc.), which is a physics simulation software based on a finite element method. The conditions of the physics simulation will now be described in detail.

The finite element method is a numerical analysis method for solving a differential equation, which cannot be solved analytically, by approximation with high precision and, in this method, a complex object to be analyzed is divided into simple subcomponents (elements), and the behavior of the whole object is calculated by approximation. In the below-described Examples, the resonance frequency of projections was calculated by the following procedures.

For each of sites i to v of a sound insulating structure illustrated in FIGS. 18 to 21, the values of physical properties shown in Tables 1 to 7 (specific gravity, storage modulus (Young's modulus), and Poisson ratio) and the values of material dimensions shown in Table 1 to 7 and FIGS. 18 to 21 ($r_1$, $r_2$, $h_i$ to $h_v$, a, and b) were substituted into the equation of the solid mechanics module of COMSOL Multiphysics (manufactured by COMSOL, Inc.) to determine the intrinsic vibration mode under a condition where the bottom surface of sheet section v was completely immobilized, and the resonance frequencies under various conditions were calculated.

Figure 18:
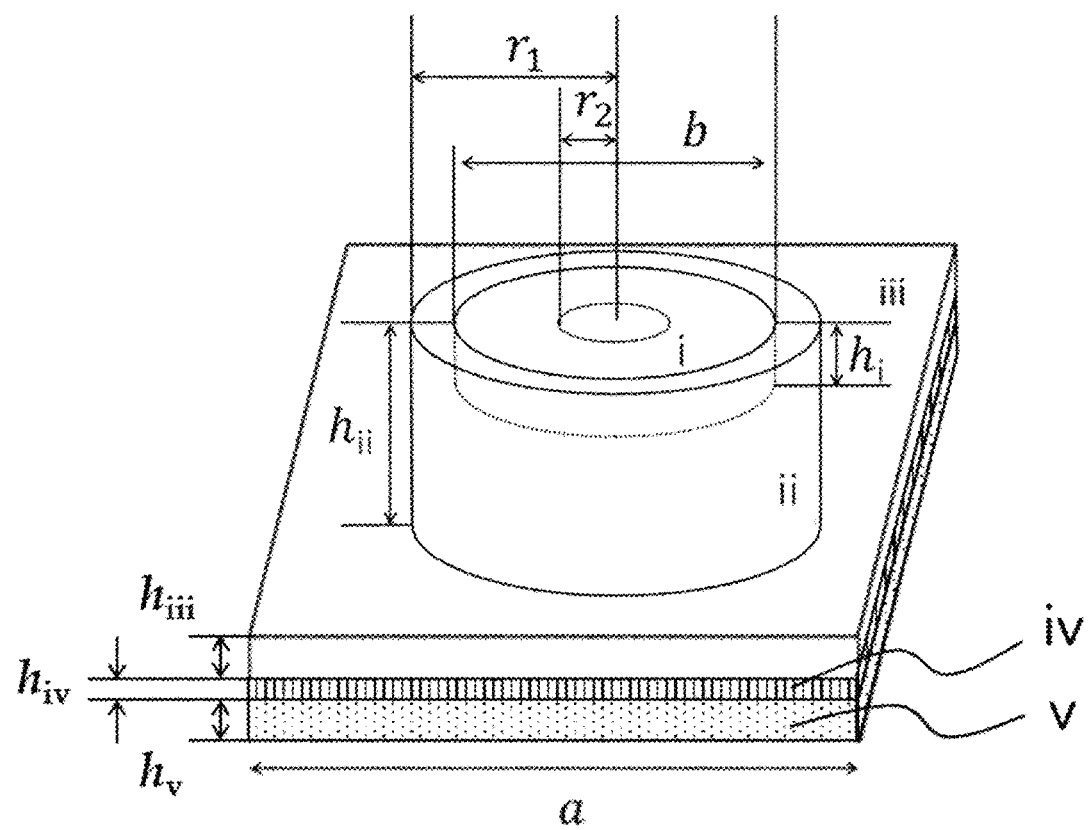
FIG. 18 is a schematic structural view of a unit cell used for estimating the natural frequency.
Figure 19:
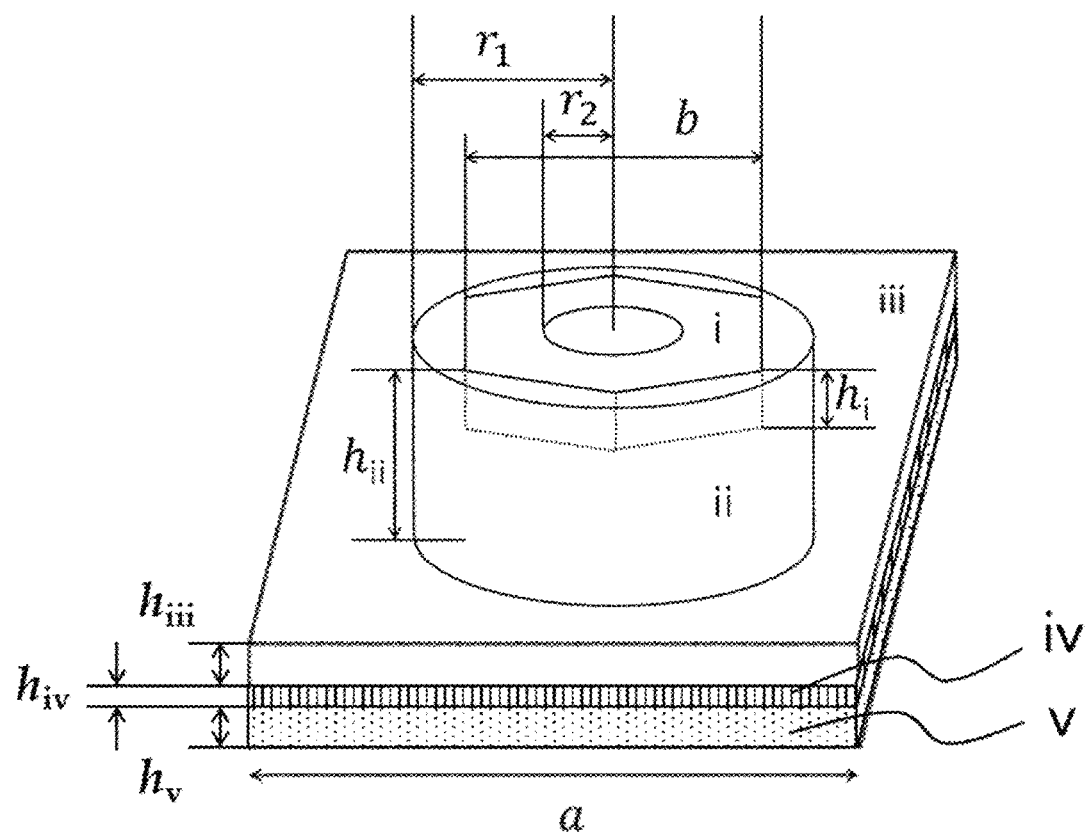
FIG. 19 is a schematic structural view of another unit cell used for estimating the natural frequency.
Figure 20:
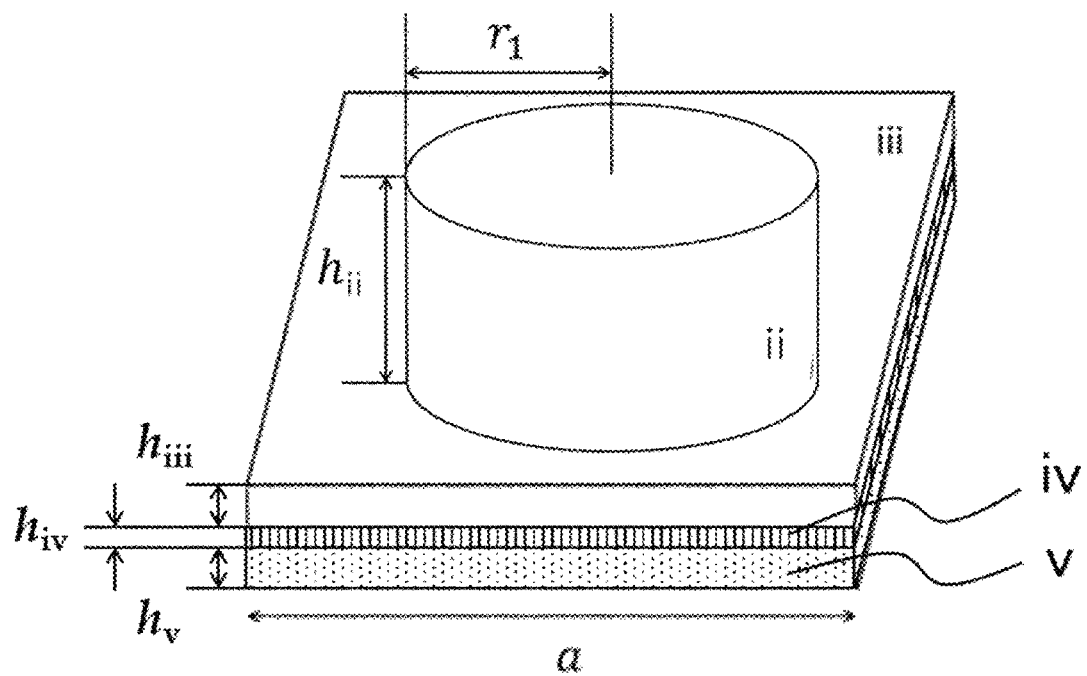
FIG. 20 is a schematic structural view of yet another unit cell used for estimating the natural frequency.
Figure 21:
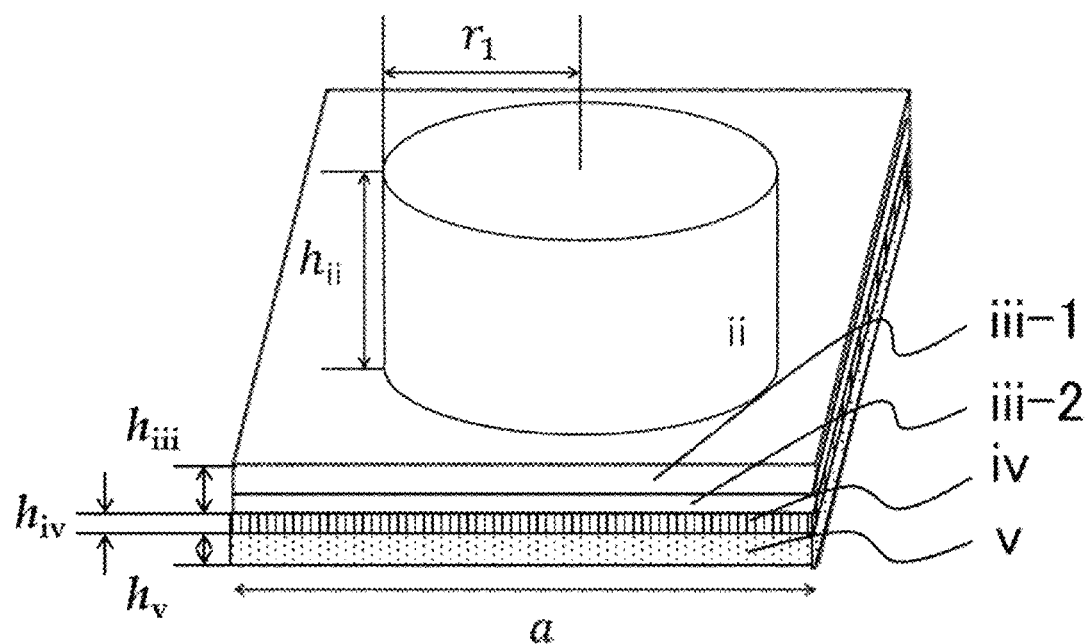
FIG. 21 is a schematic structural view of yet another unit cell used for estimating the natural frequency.

It is noted here that FIG. 18 illustrates a mode in which a holed disk was used as a weight portion; FIG. 19 illustrates a mode in which a holed nut (hexagonal plate) was used as a weight portion; FIG. 20 illustrates a mode without a weight portion; and FIG. 21 illustrates a mode in which a layered structure of a rubber layer and a PET layer was used as a sheet section without a weight portion.

Next, the resonance frequency of a case where a sound insulating structure was completely immobilized on an adherend in the absence of adhesive as an ideal state was defined as f0, and the values of the resonance frequency f in those cases where adhesives having various physical properties were used were compared.

In the below-described Examples, a small value of dF=(f−f0)/f0×100[%] was adopted as a favorable arrangement/adhesion condition. In other words, in a favorable adhesion condition, the value of dF, which is the amount of deviation from a design frequency of a sheet, is small. The value of dF is preferably as small as possible, and it is preferably 20% or less, more preferably 10% or less, still more preferably 5% or less.

EXAMPLES

The present invention will now be described more concretely by way of Examples; however, the present invention is not limited thereto by any means. The present invention can adopt various conditions as long as the object of the present invention is achieved without departing from the gist of the present invention.

[Calculation of Natural Frequency]

For each of sites i to v of a sound insulating member, the values of physical properties (specific gravity, Young's modulus, and Poisson ratio) and material dimensions ($r_1$, $r_2$, $h_i$ to $h_v$, a, and b) that are shown in Table 1 to 7 and FIGS. 18 to 21 were substituted into the equation of a solid mechanics module of a multiphysics analysis software COMSOL Multiphysics (manufactured by COMSOL, Inc.) to calculate the natural frequency during stretching vibration of projections in accordance with a finite element method. It is noted here that "H" in Tables blow represents a value calculated by $H=h_{ii}+h_{iii}-h_i$.

Further, in order to compare the amounts of natural frequency shift, the amount of normalized frequency shift was defined as follows. The below-described design natural frequency is the natural frequency of a case where the sheet and projection shapes are the same but an adhesive layer is absent.

Amount of normalized natural frequency shift (%)=
((Design natural frequency)−(Natural frequency))÷(Design natural frequency)

Figure 22:
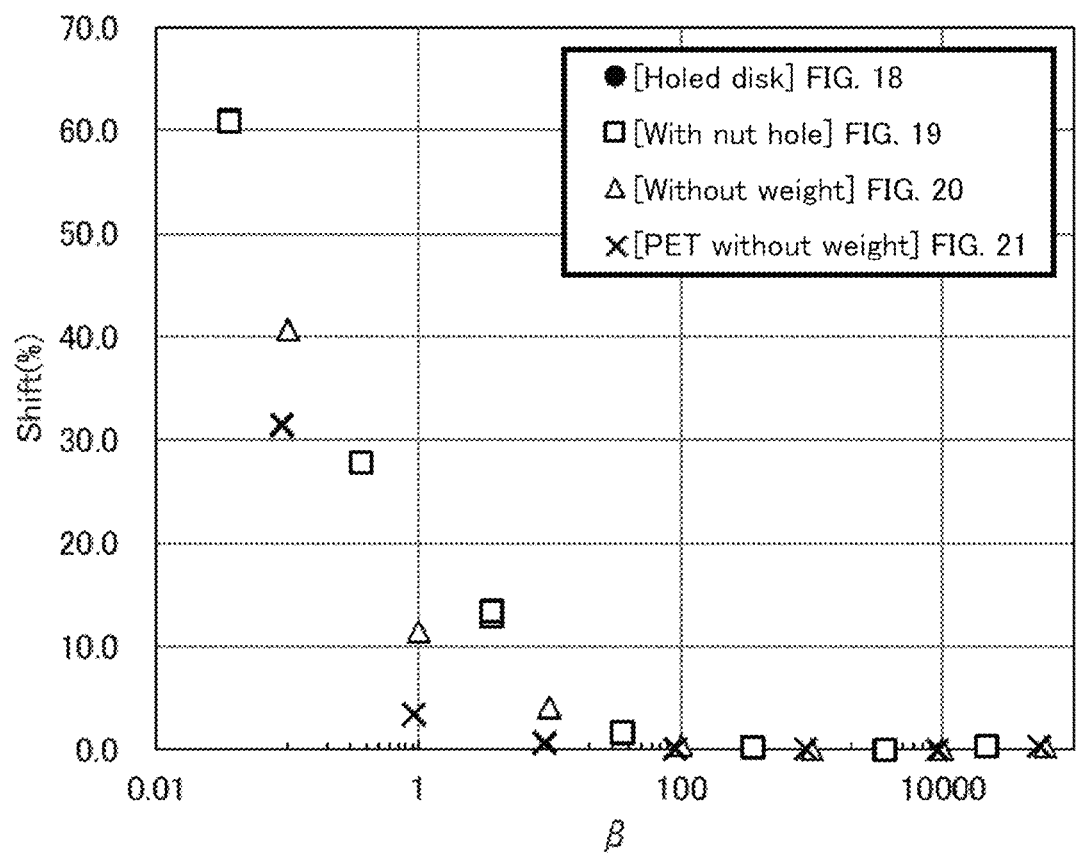
FIG. 22 is a graph showing the relationship between the amount of normalized natural frequency shift and the value and β in Examples.

FIG. 22 is graph showing the relationship between the amount of normalized natural frequency shift, which was calculated as described above, and β which is a ratio (E_glue/I_glue)/(E_membrane/H).

Mode in which Holed Disk was Used as Weight Portion

Example 1

Example 1 is a unit cell including the sound insulating sheet member illustrated in FIG. 18. The size, material, and physical properties of the constituents of this unit cell are shown in Table 1. The natural frequency of stretching vibration of the projection in the unit cell was calculated in accordance with the above-described calculation method.

As a result of calculation, in Example 1, the natural frequency was 4,353 Hz and the amount of normalized natural frequency shift was 13.4%, and it was confirmed that the frequency shift was sufficiently small and the natural frequency was as maintained designed.

Comparative Example 1

Comparative Example 1 is also a unit cell including the sound insulating sheet member illustrated in FIG. 18. The size, material, and physical properties of the constituents of this unit cell are shown in Table 1. The natural frequency of stretching vibration of the projection in the unit cell was calculated in accordance with the above-described calculation method.

As a result of calculation, in Comparative Example 1, the natural frequency was 3,626 Hz and the amount of normalized natural frequency shift was 27.8%, and it was confirmed that the frequency shift was large and the natural frequency was largely different from the design frequency due to the effect of the adhesive layer.

Reference Example 1

Reference Example 1 is also a unit cell including the sound insulating sheet member illustrated in FIG. 18. The size, material, and physical properties of the constituents of this unit cell are shown in Table 1. The natural frequency of stretching vibration of the projection in the unit cell was calculated in accordance with the above-described calculation method. This Reference Example is a mode in which an adhesive was not used.

As a result of calculation, in Reference Example 1, the natural frequency was 5,025 Hz, and the amount of normalized natural frequency shift was 0%.

TABLE 1

| | Site | r1 (mm) | r2 (mm) | H (mm) | A (mm) | B (mm) | Material | Specific gravity (g/cm³) | Young's modulus (MPa) | Poisson ratio (—) | E_glue (MPa) | I_glue (mm) | E_membrane (MPa) |
|---|---|---|---|---|---|---|---|---|---|---|---|---|---|
| Reference Example 1 | i | — | 2 | 3.2 | — | 7 | Iron | 7.87 | 206000 | 0.30 | — | — | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | — | — | — | — | — | — | — | | | |
| | v | — | — | 1 | 11 | — | Aluminum | 2.70 | 63300 | 0.29 | | | |
| Example 1 | i | — | 2 | 3.2 | — | 7 | Iron | 7.87 | 206000 | 0.30 | 10.0 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 10 | 0.49 | | | |
| | v | — | — | 1 | 11 | — | PA66 | 1.14 | 1200 | 0.30 | | | |

TABLE 1-continued

| | | r1 (mm) | r2 (mm) | h (mm) | a (mm) | b (mm) | Material | Specific gravity (g/cm³) | Young's modulus (MPa) | Poisson ratio (—) | E_glue (MPa) | l_glue (mm) | E_membrane (MPa) |
|---|---|---|---|---|---|---|---|---|---|---|---|---|---|
| Comparative Example 1 | i | — | 2 | 3.2 | — | 7 | Iron | 7.87 | 206000 | 0.30 | 0.1 | 0.05 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.05 | 11 | — | Adhesive | 1.00 | 0.1 | 0.49 | | | |
| | v | — | — | 1 | 11 | — | Aluminum | 2.70 | 63300 | 0.29 | | | |

| | Site | H (mm) | β | E_glue/E_membrane | E_glue/E_adh | Natural frequency (Hz) | Design natural frequency (Hz) | Amount of normalized natural frequency shift (%) |
|---|---|---|---|---|---|---|---|---|
| Reference Example 1 | i ii iii iv v | 1.8 | — | — | — | 5025 | 5025 | 0.0 |
| Example 1 | i ii iii iv v | 1.8 | 3.6 | 1 | 0.00833333 | 4353 | 5025 | 13.4 |
| Comparative Example 1 | i ii iii iv v | 1.8 | 0.36 | 0.01 | 0.00000158 | 3626 | 5025 | 27.8 |

<Mode in which Holed Nut (Hexagonal Column) was Used as Weight Portion>

Examples 2 to 7

Examples 2 to 7 are unit cells including the sound insulating sheet member illustrated in FIG. 19. The size, material, and physical properties of the constituents of each unit cell are shown in Table 2. The natural frequency of stretching vibration of the projection in each unit cell was calculated in accordance with the above-described calculation method.

As a result of calculation, in Examples 2 to 7, the natural frequency was 3,545 to 5,024 Hz and the amount of normalized natural frequency shift was 0.0 to 13.4%, and it was confirmed that the frequency shift was sufficiently small and the natural frequency was maintained as designed.

Comparative Examples 2 to 5

Comparative Examples 2 to 5 are also unit cells including the sound insulating sheet member illustrated in FIG. 19. The size, material, and physical properties of the constituents of each unit cell are shown in Table 3. The natural frequency of stretching vibration of the projection in each unit cell was calculated in accordance with the above-described calculation method.

As a result of calculation, in Comparative Examples 2 to 5, the natural frequency was 1,962 to 3,626 Hz and the amount of normalized natural frequency shift was 27.8 to 61.0%, and it was confirmed that the frequency shift was large and the natural frequency was largely different from the design frequency due to the effect of the adhesive layer.

TABLE 2

| | Site | r1 (mm) | r2 (mm) | h (mm) | a (mm) | b (mm) | Material | Specific gravity (g/cm³) | Young's modulus (MPa) | Poisson ratio (—) | E_glue (MPa) | l_glue (mm) | E_membrane (MPa) |
|---|---|---|---|---|---|---|---|---|---|---|---|---|---|
| Example 2 | i | — | 2 | 3.2 | — | 7 | Iron | 7.87 | 206000 | 0.30 | 10.0 | 0.05 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.05 | 11 | — | Adhesive | 1.00 | 10 | 0.49 | | | |
| | v | — | — | 1 | 11 | — | Aluminum | 2.70 | 63300 | 0.29 | | | |
| Example 3 | i | — | 2 | 3.2 | — | 7 | Iron | 7.87 | 206000 | 0.30 | 10.0 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 10 | 0.49 | | | |
| | v | — | — | 1 | 11 | — | Aluminum | 2.70 | 63300 | 0.29 | | | |
| Example 4 | i | — | 2 | 3.2 | — | 7 | Iron | 7.87 | 206000 | 0.30 | 1000.0 | 0.05 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.05 | 11 | — | Adhesive | 1.00 | 1000 | 0.49 | | | |
| | v | — | — | 1 | 11 | — | Aluminum | 2.70 | 63300 | 0.29 | | | |
| Example 5 | i | — | 2 | 3.2 | — | 7 | Iron | 7.87 | 206000 | 0.30 | 1000.0 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 1000 | 0.49 | | | |
| | v | — | — | 1 | 11 | — | Aluminum | 2.70 | 63300 | 0.29 | | | |

TABLE 2-continued

| | Site | r1 (mm) | r2 (mm) | h (mm) | a (mm) | b (mm) | Material | Specific gravity (g/cm³) | Young's modulus (MPa) | Poisson ratio (—) | E_glue (MPa) | l_glue (mm) | E_membrane (MPa) |
|---|---|---|---|---|---|---|---|---|---|---|---|---|---|
| Example 6 | i | — | 2 | 3.2 | — | 7 | Iron | 7.87 | 206000 | 0.30 | 10.0 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 10 | 0.49 | | | |
| | v | — | — | 1 | 11 | — | PA66 | 1.14 | 1200 | 0.30 | | | |
| Example 7 | i | — | 2 | 3.2 | — | 7 | Iron | 7.87 | 206000 | 0.30 | 30000.0 | 0.50 | 5.00 |
| | ii | 4.5 | — | 4.5 | — | — | Rubber | 1.05 | 5 | 0.49 | | | |
| | iii | — | — | 0.5 | 11 | — | Rubber | 1.05 | 5 | 0.49 | | | |
| | iv | — | — | 0.5 | 11 | — | Adhesive | 1.00 | 30000 | 0.49 | | | |
| | v | — | — | 1 | 11 | — | PA66 | 1.14 | 1200 | 0.30 | | | |

| | Site | H (mm) | β | E_glue/ E_membrane | E_glue/ E_adh | Natural frequency (Hz) | Design natural frequency (Hz) | Amount of normalized natural frequency shift (%) |
|---|---|---|---|---|---|---|---|---|
| Example 2 | i | 1.8 | 36 | 1 | 0.00015798 | 4944 | 5025 | 1.6 |
| | ii | | | | | | | |
| | iii | | | | | | | |
| | iv | | | | | | | |
| | v | | | | | | | |
| Example 3 | i | 1.8 | 3.6 | 1 | 0.00015798 | 4376 | 5025 | 12.9 |
| | ii | | | | | | | |
| | iii | | | | | | | |
| | iv | | | | | | | |
| | v | | | | | | | |
| Example 4 | i | 1.8 | 3600 | 100 | 0.01579779 | 5024 | 5025 | 0.0 |
| | ii | | | | | | | |
| | iii | | | | | | | |
| | iv | | | | | | | |
| | v | | | | | | | |
| Example 5 | i | 1.8 | 360 | 100 | 0.01579779 | 5015 | 5025 | 0.2 |
| | ii | | | | | | | |
| | iii | | | | | | | |
| | iv | | | | | | | |
| | v | | | | | | | |
| Example 6 | i | 1.8 | 3.6 | 1 | 0.00833333 | 4353 | 5025 | 13.4 |
| | ii | | | | | | | |
| | iii | | | | | | | |
| | iv | | | | | | | |
| | v | | | | | | | |
| Example 7 | i | 1.8 | 21600 | 6000 | 25.00000000 | 3545 | 3554 | 0.3 |
| | ii | | | | | | | |
| | iii | | | | | | | |
| | iv | | | | | | | |
| | v | | | | | | | |

TABLE 3

| | Site | r1 (mm) | r2 (mm) | h (mm) | a (mm) | b (mm) | Material | Specific gravity (g/cm³) | Young's modulus (MPa) | Poisson ratio (—) | E_glue (MPa) | l_glue (mm) | E_membrane (MPa) |
|---|---|---|---|---|---|---|---|---|---|---|---|---|---|
| Comparative Example 2 | i | — | 2 | 3.2 | — | 7 | Iron | 7.87 | 206000 | 0.30 | 0.1 | 0.05 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.05 | 11 | — | Adhesive | 1.00 | 0.1 | 0.49 | | | |
| | v | — | — | 1 | 11 | — | Aluminum | 2.70 | 63300 | 0.29 | | | |
| Comparative Example 3 | i | — | 2 | 3.2 | — | 7 | Iron | 7.87 | 206000 | 0.30 | 0.1 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 0.1 | 0.49 | | | |
| | v | — | — | 1 | 11 | — | Aluminum | 2.70 | 63300 | 0.29 | | | |
| Comparative Example 4 | i | — | 2 | 3.2 | — | 7 | Iron | 7.87 | 206000 | 0.30 | 0.1 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 0.1 | 0.49 | | | |
| | v | — | — | 1 | 11 | — | PA66 | 1.14 | 1200 | 0.30 | | | |
| Comparative Example 5 | i | — | 2 | 3.2 | — | 7 | Iron | 7.87 | 206000 | 0.30 | 0.1 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 0.1 | 0.49 | | | |
| | v | — | — | 1 | 11 | — | Iron | 7.87 | 206000 | 0.30 | | | |

TABLE 3-continued

| | Site | H (mm) | β | E_glue/ E_membrane | E_glue/ E_adh | Natural frequency (Hz) | Design natural frequency (Hz) | Amount of normalized natural frequency shift (%) |
|---|---|---|---|---|---|---|---|---|
| Comparative Example 2 | i ii iii iv v | 1.8 | 0.36 | 0.01 | 0.00000158 | 3626 | 5025 | 27.8 |
| Comparative Example 3 | i ii iii iv v | 1.8 | 0.036 | 0.01 | 0.00000158 | 1964 | 5025 | 60.9 |
| Comparative Example 4 | i ii iii iv v | 1.8 | 0.036 | 0.01 | 0.00008333 | 1962 | 5025 | 61.0 |
| Comparative Example 5 | i ii iii iv v | 1.8 | 0.036 | 0.01 | 0.00000049 | 1964 | 5025 | 60.9 |

<Mode without Weight Portion>

Examples 8 to 14

Examples 8 to 14 are unit cells including the sound insulating sheet member illustrated in FIG. 20. The size, material, and physical properties of the constituents of each unit cell are shown in Table 4. The natural frequency of stretching vibration of the projection in each unit cell was calculated in accordance with the above-described calculation method.

As a result of calculation, in Examples 8 to 14, the natural frequency was 3,759 to 5,319 Hz and the amount of normalized natural frequency shift was 0.0 to 11.4%, and it was confirmed that the frequency shift was sufficiently small and the natural frequency was maintained as designed.

Comparative Examples 6 to 8

Comparative Examples 6 to 8 are also unit cells including the sound insulating sheet member illustrated in FIG. 20. The size, material, and physical properties of the constituents of each unit cell are shown in Table 5. The natural frequency of stretching vibration of the projection in each unit cell was calculated in accordance with the above-described calculation method.

As a result of calculation, in Comparative Examples 6 to 8, the natural frequency was 3,155 to 3,156 Hz and the amount of normalized natural frequency shift was 40.7%, and it was confirmed that the frequency shift was large and the natural frequency was largely different from the design frequency due to the effect of the adhesive layer.

TABLE 4

| | Site | r1 (mm) | r2 (mm) | h (mm) | a (mm) | b (mm) | Material | Specific gravity (g/cm³) | Young's modulus (MPa) | Poisson ratio (—) | E_glue (MPa) | I_glue (mm) | E_membrane (MPa) |
|---|---|---|---|---|---|---|---|---|---|---|---|---|---|
| Example 8 | i | — | — | — | — | — | — | — | — | — | 10.0 | 0.05 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.05 | 11 | — | Adhesive | 1.00 | 10 | 0.49 | | | |
| | v | — | — | 1 | 11 | — | Aluminum | 2.70 | 63300 | 0.29 | | | |
| Example 9 | i | — | — | — | — | — | — | — | — | — | 10.0 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 10 | 0.49 | | | |
| | v | — | — | 1 | 11 | — | Aluminum | 2.70 | 63300 | 0.29 | | | |
| Example 10 | i | — | — | — | — | — | — | — | — | — | 1000.0 | 0.05 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.05 | 11 | — | Adhesive | 1.00 | 1000 | 0.49 | | | |
| | v | — | — | 1 | 11 | — | Aluminum | 2.70 | 63300 | 0.29 | | | |
| Example 11 | i | — | — | — | — | — | — | — | — | — | 1000.0 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 1000 | 0.49 | | | |
| | v | — | — | 1 | 11 | — | Aluminum | 2.70 | 63300 | 0.29 | | | |

TABLE 4-continued

| | Site | r1 (mm) | r2 (mm) | h (mm) | a (mm) | b (mm) | Material | Specific gravity (g/cm³) | Young's modulus (MPa) | Poisson ratio (—) | E_glue (MPa) | l_glue (mm) | E_membrane (MPa) |
|---|---|---|---|---|---|---|---|---|---|---|---|---|---|
| Example 12 | i | — | — | — | — | — | — | — | — | — | 10.0 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 10 | 0.49 | | | |
| | v | — | — | 1 | 11 | — | PA66 | 1.14 | 1200 | 0.30 | | | |
| Example 13 | i | — | — | — | — | — | — | — | — | — | 30000.0 | 0.50 | 5.00 |
| | ii | 4.5 | — | 4.5 | — | — | Rubber | 1.05 | 5 | 0.49 | | | |
| | iii | — | — | 0.5 | 11 | — | Rubber | 1.05 | 5 | 0.49 | | | |
| | iv | — | — | 0.5 | 11 | — | Adhesive | 1.00 | 30000 | 0.49 | | | |
| | v | — | — | 1 | 11 | — | PA66 | 1.14 | 1200 | 0.30 | | | |
| Example 14 | i | — | — | — | — | — | — | — | — | — | 0.1 | 0.05 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.05 | 11 | — | Adhesive | 1.00 | 0.1 | 0.49 | | | |
| | v | — | — | 1 | 11 | — | Aluminum | 2.70 | 63300 | 0.29 | | | |

| | Site | H (mm) | β | E_glue/ E_membrane | E_glue/ E_adh | Natural frequency (Hz) | Design natural frequency (Hz) | Amount of normalized natural frequency shift (%) |
|---|---|---|---|---|---|---|---|---|
| Example 8 | i | 5.0 | 100 | 1 | 0.00015798 | 5294 | 5319 | 0.5 |
| | ii | | | | | | | |
| | iii | | | | | | | |
| | iv | | | | | | | |
| | v | | | | | | | |
| Example 9 | i | 5.0 | 10 | 1 | 0.00015798 | 5107 | 5319 | 4.0 |
| | ii | | | | | | | |
| | iii | | | | | | | |
| | iv | | | | | | | |
| | v | | | | | | | |
| Example 10 | i | 5.0 | 10000 | 100 | 0.01579779 | 5319 | 5319 | 0.0 |
| | ii | | | | | | | |
| | iii | | | | | | | |
| | iv | | | | | | | |
| | v | | | | | | | |
| Example 11 | i | 5.0 | 1000 | 100 | 0.01579779 | 5316 | 5319 | 0.1 |
| | ii | | | | | | | |
| | iii | | | | | | | |
| | iv | | | | | | | |
| | v | | | | | | | |
| Example 12 | i | 5.0 | 10 | 1 | 0.00833333 | 5100 | 5319 | 4.1 |
| | ii | | | | | | | |
| | iii | | | | | | | |
| | iv | | | | | | | |
| | v | | | | | | | |
| Example 13 | i | 5.0 | 60000 | 6000 | 25.00000000 | 3759 | 3761 | 0.3 |
| | ii | | | | | | | |
| | iii | | | | | | | |
| | iv | | | | | | | |
| | v | | | | | | | |
| Example 14 | i | 5.0 | 1 | 0.01 | 0.00000158 | 4712 | 5319 | 11.4 |
| | ii | | | | | | | |
| | iii | | | | | | | |
| | iv | | | | | | | |
| | v | | | | | | | |

TABLE 5

| | Site | r1 (mm) | r2 (mm) | h (mm) | a (mm) | b (mm) | Material | Specific gravity (g/cm³) | Young's modulus (MPa) | Poisson ratio (—) | E_glue (MPa) | l_glue (mm) | E_membrane (MPa) |
|---|---|---|---|---|---|---|---|---|---|---|---|---|---|
| Comparative Example 6 | i | — | — | — | — | — | — | — | — | — | 0.1 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 0.1 | 0.49 | | | |
| | v | — | — | 1 | 11 | — | Aluminum | 2.70 | 63300 | 0.29 | | | |
| Comparative Example 7 | i | — | — | — | — | — | — | — | — | — | 0.1 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 0.1 | 0.49 | | | |
| | v | — | — | 1 | 11 | — | PA66 | 1.14 | 1200 | 0.30 | | | |

TABLE 5-continued

| | | r1 (mm) | r2 (mm) | h (mm) | a (mm) | b (mm) | Material | Specific gravity (g/cm³) | Young's modulus (MPa) | Poisson ratio (—) | E_glue (MPa) | L_glue (mm) | E_membrane (MPa) |
|---|---|---|---|---|---|---|---|---|---|---|---|---|---|
| Comparative Example 8 | i | — | — | — | — | — | — | — | — | — | 0.1 | 0.50 | 10.00 |
| | ii | 4.5 | — | 4.5 | — | — | Rubber | 1.05 | 10 | 0.49 | | | |
| | iii | — | — | 0.5 | 11 | — | Rubber | 1.05 | 10 | 0.49 | | | |
| | iv | — | — | 0.5 | 11 | — | Adhesive | 1.00 | 0.1 | 0.49 | | | |
| | v | — | — | 1 | 11 | — | Iron | 7.87 | 206000 | 0.30 | | | |

| | Site | H (mm) | β | E_glue/ E_membrane | E_glue/ E_adh | Natural frequency (Hz) | Design natural frequency (Hz) | Amount of normalized natural frequency shift (%) |
|---|---|---|---|---|---|---|---|---|
| Comparative Example 6 | i | 5.0 | 0.1 | 0.01 | 0.00000158 | 3156 | 5319 | 40.7 |
| | ii | | | | | | | |
| | iii | | | | | | | |
| | iv | | | | | | | |
| | v | | | | | | | |
| Comparative Example 7 | i | 5.0 | 0.1 | 0.01 | 0.00008333 | 3155 | 5319 | 40.7 |
| | ii | | | | | | | |
| | iii | | | | | | | |
| | iv | | | | | | | |
| | v | | | | | | | |
| Comparative Example 8 | i | 5.0 | 0.1 | 0.01 | 0.00000049 | 3156 | 5319 | 40.7 |
| | ii | | | | | | | |
| | iii | | | | | | | |
| | iv | | | | | | | |
| | v | | | | | | | |

<Mode in which Layered Structure of Rubber Layer and PET Layer was Used as Sheet Section without Weight Portion>

Examples 15 to 21

Examples 15 to 21 are unit cells including the sound insulating sheet member illustrated in FIG. 21. The size, material, and physical properties of the constituents of each unit cell are shown in Table 6. The natural frequency of stretching vibration of the projection in each unit cell was calculated in accordance with the above-described calculation method.

As a result of calculation, in Examples 15 to 21, the natural frequency was 3,942 to 5,577 Hz and the amount of normalized natural frequency shift was 0.0 to 3.4%, and it was confirmed that the frequency shift was sufficiently small and the natural frequency was maintained as designed.

Comparative Examples 9 to 11

Comparative Examples 9 to 11 are also unit cells including the sound insulating sheet member illustrated in FIG. 21. The size, material, and physical properties of the constituents of each unit cell are shown in Table 7. The natural frequency of stretching vibration of the projection in each unit cell was calculated in accordance with the above-described calculation method.

As a result of calculation, in Comparative Examples 9 to 11, the natural frequency was 3,822 to 3,824 Hz and the amount of normalized natural frequency shift was 31.4 to 31.5%, and it was confirmed that the frequency shift was large and the natural frequency was largely different from the design frequency due to the effect of the adhesive layer.

TABLE 6

| | Site | r1 (mm) | r2 (mm) | h (mm) | a (mm) | b (mm) | Material | Specific gravity (g/cm³) | Young's modulus (MPa) | Poisson ratio (—) | E_glue (MPa) | L_glue (mm) | E_membrane (MPa) |
|---|---|---|---|---|---|---|---|---|---|---|---|---|---|
| Example 15 | i | — | — | — | — | — | — | — | — | — | 10.0 | 0.05 | 10.55 |
| | ii | 4.5 | — | 4.5 | — | — | Rubber | 1.05 | 10 | 0.49 | | | |
| | iii-1 | — | — | 0.05 | 11 | — | Rubber | 1.05 | 10 | 0.49 | | | |
| | iii-2 | — | — | 0.25 | 11 | — | PET | 1.20 | 2400 | 0.39 | | | |
| | iv | — | — | 0.05 | 11 | — | Adhesive | 1.00 | 10 | 0.49 | | | |
| | v | — | — | 1 | 11 | — | Aluminum | 2.70 | 63300 | 0.29 | | | |
| Example 16 | i | — | — | — | — | — | — | — | — | — | 10.0 | 0.50 | 10.55 |
| | ii | 4.5 | — | 4.5 | — | — | Rubber | 1.05 | 10 | 0.49 | | | |
| | iii-1 | — | — | 0.05 | 11 | — | Rubber | 1.05 | 10 | 0.49 | | | |
| | iii-2 | — | — | 0.25 | 11 | — | PET | 1.20 | 2400 | 0.39 | | | |
| | iv | — | — | 0.5 | 11 | — | Adhesive | 1.00 | 10 | 0.49 | | | |
| | v | — | — | 1 | 11 | — | Aluminum | 2.70 | 63300 | 0.29 | | | |
| Example 17 | i | — | — | — | — | — | — | — | — | — | 1000.0 | 0.05 | 10.55 |
| | ii | 4.5 | — | 4.5 | — | — | Rubber | 1.05 | 10 | 0.49 | | | |
| | iii-1 | — | — | 0.05 | 11 | — | Rubber | 1.05 | 10 | 0.49 | | | |
| | iii-2 | — | — | 0.25 | 11 | — | PET | 1.20 | 2400 | 0.39 | | | |
| | iv | — | — | 0.05 | 11 | — | Adhesive | 1.00 | 1000 | 0.49 | | | |
| | v | — | — | 1 | 11 | — | Aluminum | 2.70 | 63300 | 0.29 | | | |

TABLE 6-continued

| | | | | | | | | | | | | |
|---|---|---|---|---|---|---|---|---|---|---|---|---|
| Example 18 | i | — | — | — | — | — | — | — | — | — | 1000.0 | 0.50 | 10.55 |
| | ii | 4.5 | — | 4.5 | — | — | Rubber | 1.05 | 10 | 0.49 | | | |
| | iii-1 | — | — | 0.05 | 11 | — | Rubber | 1.05 | 10 | 0.49 | | | |
| | iii-2 | — | — | 0.25 | 11 | — | PET | 1.20 | 2400 | 0.39 | | | |
| | iv | — | — | 0.5 | 11 | — | Adhesive | 1.00 | 1000 | 0.49 | | | |
| | v | — | — | 1 | 11 | — | Aluminum | 2.70 | 63300 | 0.29 | | | |
| Example 19 | i | — | — | — | — | — | — | — | — | — | 10.0 | 0.50 | 10.55 |
| | ii | 4.5 | — | 4.5 | — | — | Rubber | 1.05 | 10 | 0.49 | | | |
| | iii-1 | — | — | 0.05 | 11 | — | Rubber | 1.05 | 10 | 0.49 | | | |
| | iii-2 | — | — | 0.25 | 11 | — | PET | 1.20 | 2400 | 0.39 | | | |
| | iv | — | — | 0.5 | 11 | — | Adhesive | 1.00 | 10 | 0.49 | | | |
| | v | — | — | 1 | 11 | — | PA66 | 1.14 | 1200 | 0.30 | | | |
| Example 20 | i | — | — | — | — | — | — | — | — | — | 30000.0 | 0.50 | 5.27 |
| | ii | 4.5 | — | 4.5 | — | — | Rubber | 1.05 | 5 | 0.49 | | | |
| | iii-1 | — | — | 0.05 | 11 | — | Rubber | 1.05 | 5 | 0.49 | | | |
| | iii-2 | — | — | 0.25 | 11 | — | PET | 1.20 | 2400 | 0.39 | | | |
| | iv | — | — | 0.5 | 11 | — | Adhesive | 1.00 | 30000 | 0.49 | | | |
| | v | — | — | 1 | 11 | — | PA66 | 1.14 | 1200 | 0.30 | | | |
| Example 21 | i | — | — | — | — | — | — | — | — | — | 0.1 | 0.05 | 10.55 |
| | ii | 4.5 | — | 4.5 | — | — | Rubber | 1.05 | 10 | 0.49 | | | |
| | iii-1 | — | — | 0.05 | 11 | — | Rubber | 1.05 | 10 | 0.49 | | | |
| | iii-2 | — | — | 0.25 | 11 | — | PET | 1.20 | 2400 | 0.39 | | | |
| | iv | — | — | 0.05 | 11 | — | Adhesive | 1.00 | 0.1 | 0.49 | | | |
| | v | — | — | 1 | 11 | — | Aluminum | 2.70 | 63300 | 0.29 | | | |

| | Site | H (mm) | β | E_glue/ E_membrane | E_glue/ E_adh | Natural frequency (Hz) | Design natural frequency (Hz) | Amount of normalized natural frequency shift (%) |
|---|---|---|---|---|---|---|---|---|
| Example 15 | i | 4.80 | 91.02083 | 1 | 0.00015798 | 5570 | 5578 | 0.1 |
| | ii | | | | | | | |
| | iii-1 | | | | | | | |
| | iii-2 | | | | | | | |
| | iv | | | | | | | |
| | v | | | | | | | |
| Example 16 | i | 4.80 | 9.102083 | 1 | 0.00015798 | 5543 | 5578 | 0.6 |
| | ii | | | | | | | |
| | iii-1 | | | | | | | |
| | iii-2 | | | | | | | |
| | iv | | | | | | | |
| | v | | | | | | | |
| Example 17 | i | 4.80 | 9102.083 | 100 | 0.01579779 | 5577 | 5578 | 0.0 |
| | ii | | | | | | | |
| | iii-1 | | | | | | | |
| | iii-2 | | | | | | | |
| | iv | | | | | | | |
| | v | | | | | | | |
| Example 18 | i | 4.80 | 910.2083 | 100 | 0.01579779 | 5575 | 5578 | 0.1 |
| | ii | | | | | | | |
| | iii-1 | | | | | | | |
| | iii-2 | | | | | | | |
| | iv | | | | | | | |
| | v | | | | | | | |
| Example 19 | i | 4.80 | 9.102083 | 1 | 0.00833333 | 5539 | 5578 | 0.7 |
| | ii | | | | | | | |
| | iii-1 | | | | | | | |
| | iii-2 | | | | | | | |
| | iv | | | | | | | |
| | v | | | | | | | |
| Example 20 | i | 4.80 | 54606.25 | 6000 | 25.00000000 | 3942 | 3944 | 0.3 |
| | ii | | | | | | | |
| | iii-1 | | | | | | | |
| | iii-2 | | | | | | | |
| | iv | | | | | | | |
| | v | | | | | | | |
| Example 21 | i | 4.80 | 0.910208 | 0.01 | 0.00000158 | 5386 | 5578 | 3.4 |
| | ii | | | | | | | |
| | iii-1 | | | | | | | |
| | iii-2 | | | | | | | |
| | iv | | | | | | | |
| | v | | | | | | | |

TABLE 7

| | Site | r1 (mm) | r2 (mm) | h (mm) | a (mm) | b (mm) | Material | Specific gravity (g/cm³) | Young's modulus (MPa) | Poisson ratio (—) | E_glue (MPa) | l_glue (mm) | E_membrane (MPa) |
|---|---|---|---|---|---|---|---|---|---|---|---|---|---|
| Comparative Example 9 | i | — | — | — | — | — | — | — | — | — | 0.1 | 0.50 | 10.55 |
| | ii | 4.5 | — | 4.5 | — | — | Rubber | 1.05 | 10 | 0.49 | | | |
| | iii-1 | — | — | 0.05 | 11 | — | Rubber | 1.05 | 10 | 0.49 | | | |
| | iii-2 | — | — | 0.25 | 11 | — | PET | 1.20 | 2400 | 0.39 | | | |
| | iv | — | — | 0.5 | 11 | — | Adhesive | 1.00 | 0.1 | 0.49 | | | |
| | v | — | — | 1 | 11 | — | Aluminum | 2.70 | 63300 | 0.29 | | | |
| Comparative Example 10 | i | — | — | — | — | — | — | — | — | — | 0.1 | 0.50 | 10.55 |
| | ii | 4.5 | — | 4.5 | — | — | Rubber | 1.05 | 10 | 0.49 | | | |
| | iii-1 | — | — | 0.05 | 11 | — | Rubber | 1.05 | 10 | 0.49 | | | |
| | iii-2 | — | — | 0.25 | 11 | — | PET | 1.20 | 2400 | 0.39 | | | |
| | iv | — | — | 0.5 | 11 | — | Adhesive | 1.00 | 0.1 | 0.49 | | | |
| | v | — | — | 1 | 11 | — | PA66 | 1.14 | 1200 | 0.30 | | | |
| Comparative Example 11 | i | — | — | — | — | — | — | — | — | — | 0.1 | 0.50 | 10.55 |
| | ii | 4.5 | — | 4.5 | — | — | Rubber | 1.05 | 10 | 0.49 | | | |
| | iii-1 | — | — | 0.05 | 11 | — | Rubber | 1.05 | 10 | 0.49 | | | |
| | iii-2 | — | — | 0.25 | 11 | — | PET | 1.20 | 2400 | 0.39 | | | |
| | iv | — | — | 0.5 | 11 | — | Adhesive | 1.00 | 0.1 | 0.49 | | | |
| | v | — | — | 1 | 11 | — | Iron | 7.87 | 206000 | 0.30 | | | |

| | Site | H (mm) | β | E_glue/ E_membrane | E_glue/ E_adh | Natural frequency (Hz) | Design natural frequency (Hz) | Amount of normalized natural frequency shift (%) |
|---|---|---|---|---|---|---|---|---|
| Comparative Example 9 | i | 4.80 | 0.091021 | 0.01 | 0.00000158 | 3824 | 5578 | 31.4 |
| | ii | | | | | | | |
| | iii-1 | | | | | | | |
| | iii-2 | | | | | | | |
| | iv | | | | | | | |
| | v | | | | | | | |
| Comparative Example 10 | i | 4.80 | 0.091021 | 0.01 | 0.00008333 | 3822 | 5578 | 31.5 |
| | ii | | | | | | | |
| | iii-1 | | | | | | | |
| | iii-2 | | | | | | | |
| | iv | | | | | | | |
| | v | | | | | | | |
| Comparative Example 11 | i | 4.80 | 0.091021 | 0.01 | 0.00000049 | 3824 | 5578 | 31.4 |
| | ii | | | | | | | |
| | iii-1 | | | | | | | |
| | iii-2 | | | | | | | |
| | iv | | | | | | | |
| | v | | | | | | | |

From Tables 1 to 7 above and FIG. 22, it was found that, when the value of β is 0.5 or larger, a shift in the frequency band where a sound insulating effect is generated is unlikely to occur, specifically, the amount of normalized natural frequency shift is 20% or less. It was also found that no frequency shift occurs when the value of β is 100 or larger.

DESCRIPTION OF SYMBOLS

1: sound insulating structure
10: sheet section
10(a): layer (constituting sheet section)
10(b): layer (constituting sheet section)
10(c): layer (constituting sheet section)
11: resonant part
12: sound insulating member
13: adherend
14: adhesive layer
21: base portion
22: weight portion
31: rib-like protruding part
32: cylindrical protruding part
61: mold
61a: cavity
H: height of sheet section and resonant part (projection)
H_sheet: height of sheet section
H_res: height of resonant part
l_glue: average thickness of adhesive layer
r1: radius of weight portion
r2: radius of hole of weight portion
h: height
h_sheet: height
h_res: height
h_glue: thickness
a: sheet length
i: weight portion
ii: base portion
iii: sheet section
iii-1: sheet section 1
iii-2: sheet section 2
iv: adhesive layer
v: adherend

What is claimed is:
1. A sound insulating structure, comprising, at least:
a sound insulating member that comprises a sheet-like sheet section and plural projections arranged on one side of the sheet section; and
an adhesive layer arranged on a surface of the sheet section on the opposite side of the side provided with the projections, and an adherend to which the sound insulating member is adhered via the adhesive layer, wherein a storage modulus of the adherend is not less than 500 MPa, the adherend includes:

at least one selected from the group consisting of polyacetal (POM), polyamide (PA), polycarbonate (PC), modified polyphenylene ether (m-PPE), polybutylene terephthalate (PBT), ultrahigh-molecular-weight polyethylene (UHPE), syndiotactic polystyrene (SPS), amorphous polyarylate (PAR), polysulfone (PSF), polyether sulfone (PES), polyphenylene sulfide (PPS), polyether ketone (PEEK), polyimide (PI), polyether imide (PEI), fluororesins (fluorocarbon polymers), and liquid crystal polymers (LCP), and/or at least one metal selected from the group consisting of aluminum, iron, stainless steel and alloys thereof, the sound insulating structure satisfies the following Formula (1):

$$E\_glue/I\_glue > 0.5 \times (E\_membrane/H) \quad (1)$$

E_glue (MPa): storage modulus of adhesive layer
I_glue (mm): average thickness of adhesive layer
E_membrane (MPa): storage modulus of sheet section and projections
H (mm): average height of sheet section and projections, and the E glue (MPa) of the storage modulus of adhesive layer and the E membrane (MPa) of storage modulus of sheet section and projections are measured in a measurement atmosphere having a temperature of 23° C. and a humidity of 50% RH.

2. The sound insulating structure according to claim 1, wherein an amount of normalized natural frequency shift satisfying the following formula is 0 to 30%:

Amount of normalized natural frequency shift (%)= ((Design natural frequency)−(Natural frequency))÷(Design natural frequency)

Design natural frequency (Hz): natural frequency determined in a condition without adhesive layer
Natural frequency (Hz): natural frequency determined in a condition with adhesive layer.

3. The sound insulating structure according to claim 1, wherein the adhesive layer has an elastic modulus of more than 10 MPa.

4. The sound insulating structure according to claim 1, satisfying the following Formulae (2) and (3):

$$7{,}000 \geq E\_glue/E\_membrane \geq 0.5 \quad (2)$$

$$50.0 \geq E\_glue/E\_adh \geq 0.00002 \quad (3)$$

E_glue (MPa): storage modulus of adhesive layer
E_membrane (MPa): storage modulus of sheet section and projections
E_adh (MPa): storage modulus of adherend.

5. The sound insulating structure according to claim 1, satisfying the following Formula (4):

$$1.0 \geq I\_glue \geq 0.005 \quad (4)$$

I_glue (mm): average thickness of adhesive layer.

6. The sound insulating structure according to claim 1, wherein Formula (1) satisfies the following Formula (1)':

$$E\_glue/I\_glue > \beta \times (E\_membrane/H) \quad (1)'$$

wherein, E_glue, I_glue, E_membrane, and H have the same meanings as in Formula (1), and $\beta=5$.

7. The sound insulating structure according to claim 1, wherein the E_glue is more than 10 MPa.

8. The sound insulating structure according to claim 1, wherein the adhesive layer comprises one or more resins selected from the group consisting of silicone resins, epoxy resins, and cyanoacrylate resins, and a total content ratio of these resins in the adhesive layer is 10% by weight or more.

9. The sound insulating structure according to claim 1, wherein the adhesive layer comprises an inorganic filler, and a content ratio of the inorganic filler in the adhesive layer is 1% by weight or more.

10. A method of producing the sound insulating structure according to claim 1, the method comprises:

forming the sound insulating member having plural projections on the one side of the sheet section; and arranging the adhesive layer on the sound insulating member, and arranging the adherend to which the sound insulating member is adhered via the adhesive layer.

11. The sound insulating structure according to claim 1, wherein the adherend is not a part of another sound insulating member.

12. The sound insulating structure according to claim 1, wherein the adhesive layer adheres to a product or component to be sound-insulated.

13. The sound insulating structure according to claim 1, wherein the adhesive layer comprises silicone resin.

14. The sound insulating structure according to claim 1, wherein the adhesive layer comprises cyanoacrylate resin.

15. The sound insulating structure according to claim 1, wherein the adherend includes polyacetal (POM).

16. The sound insulating structure according to claim 1, wherein the adherend includes polyamide (PA).

17. The sound insulating structure according to claim 1, wherein the adherend includes polycarbonate (PC).

18. The sound insulating structure according to claim 1, wherein the adherend includes modified polyphenylene ether (m-PPE).

* * * * *